United States Patent
Xu et al.

(10) Patent No.: US 11,963,242 B2
(45) Date of Patent: Apr. 16, 2024

(54) COMMUNICATION METHOD AND APPARATUS

(71) Applicant: HUAWEI TECHNOLOGIES CO., LTD., Guangdong (CN)

(72) Inventors: Changchun Xu, Shanghai (CN); Zhongping Chen, Shanghai (CN); Yuan Wang, Shanghai (CN); Yan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 504 days.

(21) Appl. No.: 17/199,806

(22) Filed: Mar. 12, 2021

(65) Prior Publication Data

US 2021/0204336 A1 Jul. 1, 2021

Related U.S. Application Data

(63) Continuation of application No. PCT/CN2019/103421, filed on Aug. 29, 2019.

(30) Foreign Application Priority Data

Oct. 8, 2018 (CN) .......................... 201811167844.X

(51) Int. Cl.
*H04W 84/12* (2009.01)
*H04L 45/74* (2022.01)
(Continued)

(52) U.S. Cl.
CPC ............ *H04W 76/11* (2018.02); *H04L 45/74* (2013.01); *H04W 84/12* (2013.01)

(58) Field of Classification Search
CPC ..... H04W 76/11; H04W 84/12; H04W 76/12; H04W 4/08; H04W 8/20; H04L 45/74
(Continued)

(56) References Cited

U.S. PATENT DOCUMENTS

2001/0040890 A1* 11/2001 Yamashita .............. H04L 12/66
370/419
2004/0066769 A1* 4/2004 Ahmavaara ........... H04L 63/029
370/338
(Continued)

FOREIGN PATENT DOCUMENTS

CN 1578236 A 2/2005
CN 101783769 A 7/2010
(Continued)

OTHER PUBLICATIONS

SA WG2 Meeting #128-bis Aug. 20-24, 2018, Sophia Antipolis, France, 52-187937 (Year: 2018).*
ETSI TS 123 502 V15.3.0 (Sep. 2018), 3GPP, 5G; Procedures for the 5G System (3GPP TS 23.502 version 15.3.0 Release 15), Sep. 2018, 329 pages.
(Continued)

*Primary Examiner* — Inder P Mehra
(74) *Attorney, Agent, or Firm* — Fish & Richardson P.C.

(57) ABSTRACT

This application provides a communication method and apparatus. The method includes: After receiving a first packet from a first device, a first user plane network element determines a user plane LAN identifier corresponding to the first packet, where the user plane LAN identifier is an identifier that is in a user plane and that is of a LAN group to which the terminal belongs, and one user plane LAN identifier corresponds to one LAN group. That is, a function of the user plane LAN identifier is to isolate user plane packets of different LAN groups. Then, the first user plane network element sends the first packet to a second device based on the user plane LAN identifier and a destination address included in the first packet, so that the first packet sent by one terminal in the LAN group is sent to another terminal in the LAN group.

15 Claims, 13 Drawing Sheets

(51) Int. Cl.
*H04W 4/08* (2009.01)
*H04W 8/20* (2009.01)
*H04W 76/11* (2018.01)
*H04W 76/12* (2018.01)

(58) Field of Classification Search
USPC .......................................................... 370/328
See application file for complete search history.

(56) References Cited

U.S. PATENT DOCUMENTS

| | | | | |
|---|---|---|---|---|
| 2015/0117310 A1* | 4/2015 | Zexian | .................. | H04W 40/00 370/328 |
| 2015/0156661 A1* | 6/2015 | Lu et al. | ........... | H04W 28/0252 370/236 |

FOREIGN PATENT DOCUMENTS

| | | | |
|---|---|---|---|
| CN | 102271082 | A | 12/2011 |
| CN | 102932254 | A | 2/2013 |
| CN | 105915427 | A | 8/2016 |
| CN | 107995603 | A | 5/2018 |
| CN | 108075969 | A | 5/2018 |
| WO | 2018175974 | A1 | 9/2018 |

OTHER PUBLICATIONS

Extended European Search Report in European Application No. 19872136.7, dated Sep. 1, 2021, 8 pages.

3GPP TR 23.734 V0.2.0 (Sep. 2018), "3rd Generation Partnership Project; Technical Specification Group Services and System Aspects; Study on 5GS Enhanced support of Vertical and LAN Services (Release 16)," Sep. 2018, 39 pages.

Huawei, HiSilicon, "The mechanism for the 5GS to configure service restriction for a particular 5GLAN group," 3GPP TSG-SA WG2 Meeting #128bis, S2-188298, Sophia Antipolis, France, Aug. 20-24, 2018, 4 pages.

Huawei, HiSilicon, "Solution for KI#4 and KI#5: Basic architecture for supporting dynamic 5G LAN-type service and 5GLAN communication," 3GPP TSG-SA WG2 Meeting #128bis, S2-188340, Sophia Antipolis, France, Aug. 20-24, 2018, 3 pages.

Office Action issued in Chinese Application No. 201811167844.X dated Nov. 25, 2020, 7 pages.

PCT International Search Report and Written Opinion issued in International Application No. PCT/CN2019/103421 dated Nov. 28, 2019, 12 pages (with English translation).

Vivo, "Solution for how to support 5G Lan group communication," SA WG2 Meeting #128-bis, S2-187937, Sophia Antipolis, France, Aug. 20-24, 2018, 6 pages.

\* cited by examiner

COMMUNICATION METHOD AND APPARATUS

CROSS-REFERENCE TO RELATED APPLICATIONS

This application is a continuation of International Application No. PCT/CN2019/103421, filed on Aug. 29, 2019, which claims priority to Chinese Patent Application No. 201811167844.X, filed on Oct. 8, 2018. The disclosures of the aforementioned applications are hereby incorporated by reference in their entireties.

TECHNICAL FIELD

This application relates to the field of mobile communications technologies, and in particular, to a communication method and a communications apparatus.

BACKGROUND

The 3rd generation partnership project (3GPP) proposes that mutually isolated group communication needs to be created for different local area network (LAN) groups. A LAN group is a management concept of an application layer. For example, a LAN group may include devices such as a programmable logic controller, a sensor, and an actuator that execute a same procedure. For another example, a LAN group may alternatively include personal computers used by employees of a financial department of an enterprise.

Currently, a 3GPP network can provide only an access service for a terminal. That is, the terminal accesses an external data network (DN) or a local area data network (LADN). Communication between different terminals in a LAN group cannot be implemented in the 3GPP network.

SUMMARY

This application provides a communication method and a communications apparatus, to implement communication between different terminals in a LAN group.

According to a first aspect, this application provides a communication method. The method includes: A first user plane network element receives a first packet from a first device; the first user plane network element determines a user plane LAN identifier corresponding to the first packet, where the user plane LAN identifier is a user plane identifier of a LAN group; and the first user plane network element sends the first packet to a second device based on the user plane LAN identifier and a destination address in the first packet. Based on the solution, after receiving the first packet from the first device (which may be a first terminal or a second user plane network element), the first user plane network element determines the user plane LAN identifier corresponding to the first packet, where the user plane LAN identifier is an identifier that is in a user plane and that is of a LAN group to which the terminal belongs, and one user plane LAN identifier corresponds to one LAN group. Then, the first user plane network element sends the first packet to the second device (which may be a second terminal or a third user plane network element) based on the user plane LAN identifier and the destination address included in the first packet, so that the first packet sent by one terminal in the LAN group is sent to another terminal in the LAN group.

In a possible implementation, the first device is a first terminal; and that the first user plane network element determines a user plane LAN identifier corresponding to the first packet includes: The first user plane network element determines flow characteristic information of the first packet, where the flow characteristic information is a session identifier, a session identifier and a quality of service flow identifier (QFI), a tunnel endpoint identifier (TEID), or a TEID and a QFI; and the first user plane network element determines, according to a LAN identification rule, the user plane LAN identifier corresponding to the first packet, where the LAN identification rule includes a correspondence between the flow characteristic information and the user plane LAN identifier. Based on the solution, the first user plane network element determines, according to the LAN identification rule, the user plane LAN identifier corresponding to the first packet.

In a possible implementation, the first device is a second user plane network element; and that the first user plane network element determines a user plane LAN identifier corresponding to the first packet includes: The first user plane network element determines an identifier of a tunnel for receiving the first packet; and the first user plane network element determines, according to a LAN identification rule, the user plane LAN identifier corresponding to the first packet, where the LAN identification rule includes a correspondence between the identifier of the tunnel and the user plane LAN identifier. Based on the solution, the first user plane network element determines, according to the LAN identification rule, the user plane LAN identifier corresponding to the first packet.

In a possible implementation, that the first user plane network element sends the first packet to a second device based on the user plane LAN identifier and a destination address in the first packet includes: The first user plane network element determines, based on the user plane LAN identifier, a virtual forwarding instance corresponding to the user plane LAN identifier, where the virtual forwarding instance includes a correspondence between the destination address and a forwarding port, and the forwarding port corresponds to the second device; the first user plane network element determines the forwarding port based on the virtual forwarding instance; and the first user plane network element sends the first packet to the second device through the forwarding port. Based on the solution, one user plane LAN identifier uniquely identifies one virtual forwarding instance, and the virtual forwarding instance is a virtual forwarding instance corresponding to one LAN group. The virtual forwarding instance stores the correspondence between the destination address and the forwarding port. Therefore, the forwarding port for the first packet is determined by using the virtual forwarding instance.

In a possible implementation, the first user plane network element receives the LAN identification rule from a first control plane network element. That is, the LAN identification rule of the first user plane network element is sent by the first control plane network element.

In a possible implementation, the first user plane network element receives the user plane LAN identifier from the first control plane network element. That is, the user plane LAN identifier of the first user plane network element is sent by the first control plane network element.

In a possible implementation, the second device may be a second terminal or a third user plane network element. That is, the first user plane network element may forward the first packet to a terminal other than the first terminal in the LAN group, namely, the second terminal. Alternatively, the first user plane network element may send the first packet to another user plane network element, namely, the third user plane network element, and then, the third user plane network element forwards the received first packet to the terminal other than the first terminal in the LAN group. In this way, the terminals in the LAN group send packets to each other.

In a possible implementation, the user plane LAN identifier is a single virtual local area network (VLAN) identifier (ID), a double VLAN ID, or a route distinguisher (RD).

According to a second aspect, this application provides a communication method. The method includes: A first control plane network element determines that a type of a service requested by a terminal is a LAN service; the first control plane network element obtains LAN service information corresponding to the terminal, where the LAN service information includes an identifier of a LAN group corresponding to the terminal; the first control plane network element allocates a user plane LAN identifier to the terminal based on the LAN service information; the first control plane network element determines flow characteristic information of the terminal, where the flow characteristic information is a session identifier, a session identifier and a quality of service flow identifier QFI, a tunnel endpoint identifier TEID, or a TEID and a QFI; and the first control plane network element sends a LAN identification rule and the user plane LAN identifier to a user plane network element, where the LAN identification rule includes a correspondence between the flow characteristic information and the user plane LAN identifier. Based on the solution, the first control plane network element may determine an identifier that is in a user plane and that is of the LAN group corresponding to the terminal, namely, the user plane LAN identifier, and then send, to the user plane network element, the LAN identification rule and the user plane LAN identifier that correspond to the terminal. The user plane network element processes a packet from the terminal based on the LAN identification rule and the user plane LAN identifier, where the LAN identification rule includes the correspondence, of the terminal, between the flow characteristic information and the user plane LAN identifier.

In a possible implementation, the first control plane network element may further select the user plane network element for the terminal based on a distribution location of a user plane network element in the LAN group.

In a possible implementation, the first control plane network element may further receive an uplink packet from the user plane network element and the session identifier; and the first control plane network element obtains the LAN service information based on the uplink packet.

In another possible implementation, the first control plane network element receives a session establishment request message from the terminal, where the session establishment request message includes the type of the service requested by the terminal, and the type of the service is the LAN service.

In another possible implementation, the first control plane network element sends a subscription information request message to a data management network element, where the subscription information request message includes an identifier of the terminal; the first control plane network element receives a subscription information response message from the data management network element, where the subscription information response message indicates that the terminal has subscribed to the LAN service; and the first control plane network element determines, based on the subscription information response message, that the type of the service requested by the terminal is the LAN service.

In another possible implementation, that the first control plane network element obtains LAN service information corresponding to the terminal includes: The first control plane network element locally obtains the LAN service information corresponding to the terminal; or the first control plane network element obtains the LAN service information corresponding to the terminal from the data management network element; or the first control plane network element obtains the LAN service information corresponding to the terminal from an application server.

In another possible implementation, the first control plane network element may further determine an identifier of a tunnel, where the LAN identification rule sent by the first control plane network element to the user plane network element further includes a correspondence between the identifier of the tunnel and the user plane LAN identifier, and the tunnel is a tunnel between the user plane network element and another user plane network element.

According to a third aspect, this application provides a communication method. The method includes: A network service management network element receives a request message from a session management network element, where the request message includes an identifier of a first terminal, and the request message is used to request a LAN service; the network service management network element obtains LAN service information corresponding to the first terminal, where the LAN service information includes an identifier of a LAN group corresponding to the first terminal; the network service management network element allocates a user plane LAN identifier to the first terminal based on the LAN service information; the network service management network element determines flow characteristic information of the first terminal, where the flow characteristic information is a session identifier, a session identifier and a QFI, a TEID, or a TEID and a QFI; and the network service management network element sends a LAN identification rule and the user plane LAN identifier to the session management network element, where the LAN identification rule includes a correspondence between the flow characteristic information and the user plane LAN identifier. Based on the solution, the network service management network element may determine an identifier that is in a user plane and that is of the LAN group corresponding to the terminal, namely, the user plane LAN identifier, and then send, to the session management network element, the LAN identification rule and the user plane LAN identifier that correspond to the terminal. Then, the session management network element sends the received LAN identification rule and user plane LAN identifier to a user plane network element, so that the user plane network element can process a packet from the first terminal based on the LAN identification rule and the user plane LAN identifier, where the LAN identification rule includes the correspondence, of the terminal, between the flow characteristic information and the user plane LAN identifier.

In a possible implementation, that the network service management network element obtains LAN service information corresponding to the terminal includes: The network service management network element locally obtains the LAN service information corresponding to the first terminal; or the network service management network element obtains the LAN service information corresponding to the first terminal from a data management network element; or the network service management network element obtains the LAN service information corresponding to the first terminal from an application server; or if the request message further includes the identifier of the LAN group, the network service management network element obtains the LAN service information corresponding to the first terminal from the request message.

In a possible implementation, the LAN service information further includes member information of the LAN group, and the member information includes at least one of an identifier, location information, or a terminal type of a second terminal.

In a possible implementation, the network service management network element may further select a user plane network element for the first terminal based on a distribution location of a user plane network element in the LAN group; and the network service management network element sends an identifier of the user plane network element to the session management network element.

In a possible implementation, the network service management network element may further determine an identifier of a tunnel, where the LAN identification rule sent by the network service management network element to the session management network element further includes a correspondence between the identifier of the tunnel and the user plane LAN identifier, and the tunnel is a tunnel between different user plane network elements.

According to a fourth aspect, this application provides a communication method. The method includes: A session management network element receives a session establishment request message from a terminal, where the session establishment request message includes an identifier of the terminal; the session management network element determines that a type of a service requested by the terminal is a LAN service; the session management network element sends a request message to a network service management network element, where the request message includes the identifier of the terminal, and the request message is used to request the LAN service; the session management network element receives a LAN identification rule and a user plane LAN identifier from the network service management network element, where the LAN identification rule includes a correspondence between flow characteristic information and the user plane LAN identifier, and the flow characteristic information is a session identifier, a session identifier and a QFI, a TEID, or a TEID and a QFI; the session management network element sends the LAN identification rule and the user plane LAN identifier to a user plane network element, where the LAN identification rule includes the correspondence between the flow characteristic information and the user plane LAN identifier. Based on the solution, after receiving the session establishment request message from the terminal, the session management network element determines that the type of the service requested by the terminal is the LAN service, and requests the LAN service from the network service management network element, so that the network service management network element may determine an identifier that is in a user plane and that is of a LAN group corresponding to the terminal, namely, the user plane LAN identifier, and then send, to the session management network element, the LAN identification rule and the user plane LAN identifier that correspond to the terminal. Then, the session management network element sends the received LAN identification rule and user plane LAN identifier to the user plane network element, so that the user plane network element can process a packet from the terminal based on the LAN identification rule and the user plane LAN identifier, where the LAN identification rule includes the correspondence, of the terminal, between the flow characteristic information and the user plane LAN identifier.

In a possible implementation, the session establishment request message includes the type of the service requested by the terminal, and the type of the service is the LAN service.

In a possible implementation, the session establishment request message further includes an identifier of a LAN group, and the request message further includes the identifier of the LAN group.

In a possible implementation, the session management network element sends a subscription information request message to a data management network element, where the subscription information request message includes the identifier of the terminal; the session management network element receives a subscription information response message from the data management network element, where the subscription information response message indicates that the terminal has subscribed to the LAN service; and that the session management network element determines that a type of a service requested by the terminal is a LAN service includes: The session management network element determines, based on the subscription information response message, that the type of the service requested by the terminal is the LAN service.

According to a fifth aspect, this application provides a communication method. The method includes: A network service management network element receives a request message from a session management network element, where the request message includes an identifier of a user plane network element and packet information, the packet information includes an uplink packet or partial information of the uplink packet, and the request message is used to request a LAN service corresponding to the uplink packet; the network service management network element obtains LAN service information corresponding to the uplink packet, where the LAN service information includes an identifier of a LAN group corresponding to a first terminal; the network service management network element allocates a user plane LAN identifier to the first terminal based on the LAN service information; the network service management network element determines flow characteristic information of the first terminal, where the flow characteristic information is a session identifier, a session identifier and a QFI, a TEID, or a TEID and a QFI; and the network service management network element sends the user plane LAN identifier and a LAN identification rule to the session management network element, where the LAN identification rule includes a correspondence between the flow characteristic information and the user plane LAN identifier. Based on the solution, the network service management network element may determine an identifier that is in a user plane and that is of the LAN group corresponding to the terminal, namely, the user plane LAN identifier, and then send, to the session management network element, the LAN identification rule and the user plane LAN identifier that correspond to the terminal. Then, the session management network element sends the received LAN identification rule and user plane LAN identifier to the user plane network element, so that the user plane network element can process a packet from the first terminal based on the LAN identification rule and the user plane LAN identifier, where the LAN identification rule includes the correspondence, of the terminal, between the flow characteristic information and the user plane LAN identifier.

In a possible implementation, that the network service management network element obtains LAN service information corresponding to the uplink packet includes: The network service management network element locally obtains the LAN service information corresponding to the uplink packet; or the network service management network element obtains the LAN service information corresponding to the uplink packet from an application server.

In a possible implementation, the LAN service information further includes member information of the LAN group, and the member information includes at least one of an identifier, location information, or a terminal type of a second terminal.

In a possible implementation, the network service management network element may further determine an identifier of a tunnel, where the LAN identification rule sent by the network service management network element to the session management network element further includes a correspondence between the identifier of the tunnel and the user plane LAN identifier, and the tunnel is a tunnel between different user plane network elements.

According to a sixth aspect, this application provides a communication method. The method includes: A session management network element receives a session establishment request message from a terminal, where the session establishment request message includes an identifier of the terminal and a session identifier; the session management network element determines that a type of a service requested by the terminal is a LAN service, where there is an association between a session and the LAN service; the session management network element selects a user plane network element for the terminal; the session management network element receives an uplink packet from the user plane network element; the session management network element sends a request message to the network service management network element, where the request message includes an identifier of the user plane network element and packet information, the packet information includes the uplink packet or partial information of the uplink packet, and the request message is used to request a LAN service corresponding to the uplink packet; and the session management network element receives a LAN identification rule and a user plane LAN identifier from the network service management network element, where the user plane LAN identifier corresponds to the uplink packet, the LAN identification rule includes a correspondence between flow characteristic information and the user plane LAN identifier, and the flow characteristic information is the session identifier, the session identifier and a QFI, a TEID, or a TEID and a QFI. Based on the solution, after receiving the session establishment request message from the terminal, the session management network element determines that the type of the service requested by the terminal is the LAN service, and requests the LAN service from the network service management network element after receiving the uplink packet from the user plane network element, so that the network service management network element may determine an identifier that is in a user plane and that is of a LAN group corresponding to the terminal, namely, the user plane LAN identifier, and then send, to the session management network element, the LAN identification rule and the user plane LAN identifier that correspond to the terminal. Then, the session management network element sends the received LAN identification rule and user plane LAN identifier to the user plane network element, so that the user plane network element can process a packet from the terminal based on the LAN identification rule and the user plane LAN identifier, where the LAN identification rule includes the correspondence, of the terminal, between the flow characteristic information and the user plane LAN identifier.

In a possible implementation, the session establishment request message includes the type of the service requested by the terminal, and the type of the service is the LAN service.

In a possible implementation, the session management network element sends a subscription information request message to a data management network element, where the subscription information request message includes the identifier of the terminal; the session management network element receives a subscription information response message from the data management network element, where the subscription information response message indicates that the terminal has subscribed to the LAN service; and that the session management network element determines that a type of a service requested by the terminal is a LAN service includes: The session management network element determines, based on the subscription information response message, that the type of the service requested by the terminal is the LAN service.

According to a seventh aspect, this application provides an apparatus. The apparatus may be a user plane network element, a first control plane network element, a session management network element, a network service management network element, or a chip. The apparatus has a function of implementing the embodiments of any one of the first aspect, the second aspect, the third aspect, the fourth aspect, the fifth aspect, or the sixth aspect. The function may be implemented by hardware, or may be implemented by hardware executing corresponding software. The hardware or the software includes one or more modules corresponding to the foregoing function.

According to an eighth aspect, an apparatus is provided. The apparatus includes a processor and a memory. The memory is configured to store a computer-executable instruction. When the apparatus runs, the processor executes the computer-executable instruction stored in the memory, so that the apparatus performs the communication method according to any one of the first aspect or the possible implementations of the first aspect, or performs the communication method according to any one of the second aspect or the possible implementations of the second aspect, or performs the communication method according to any one of the third aspect or the possible implementations of the third aspect, or performs the communication method according to any one of the fourth aspect or the possible implementations of the fourth aspect, or performs the communication method according to any one of the fifth aspect or the possible implementations of the fifth aspect, or performs the communication method according to any one of the sixth aspect or the possible implementations of the sixth aspect.

According to a ninth aspect, this application further provides a computer-readable storage medium. The computer-readable storage medium stores an instruction. When the instruction is run on a computer, the computer is enabled to perform the methods according to the foregoing aspects.

According to a tenth aspect, this application further provides a computer program product including an instruction. When the computer program product runs on a computer, the computer is enabled to perform the methods according to the foregoing aspects.

DESCRIPTION OF EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise stated, "a plurality of" means two or more than two.

A network architecture and a service scenario described in the embodiments of this application are intended to describe the technical solutions in the embodiments of this application more clearly, and do not constitute a limitation the technical solutions provided in the embodiments of this application. A person of ordinary skill in the art may learn that with evolution of the network architecture and emergence of new service scenarios, the technical solutions provided in the embodiments of this application are also applicable to similar technical problems.

Figure 1:
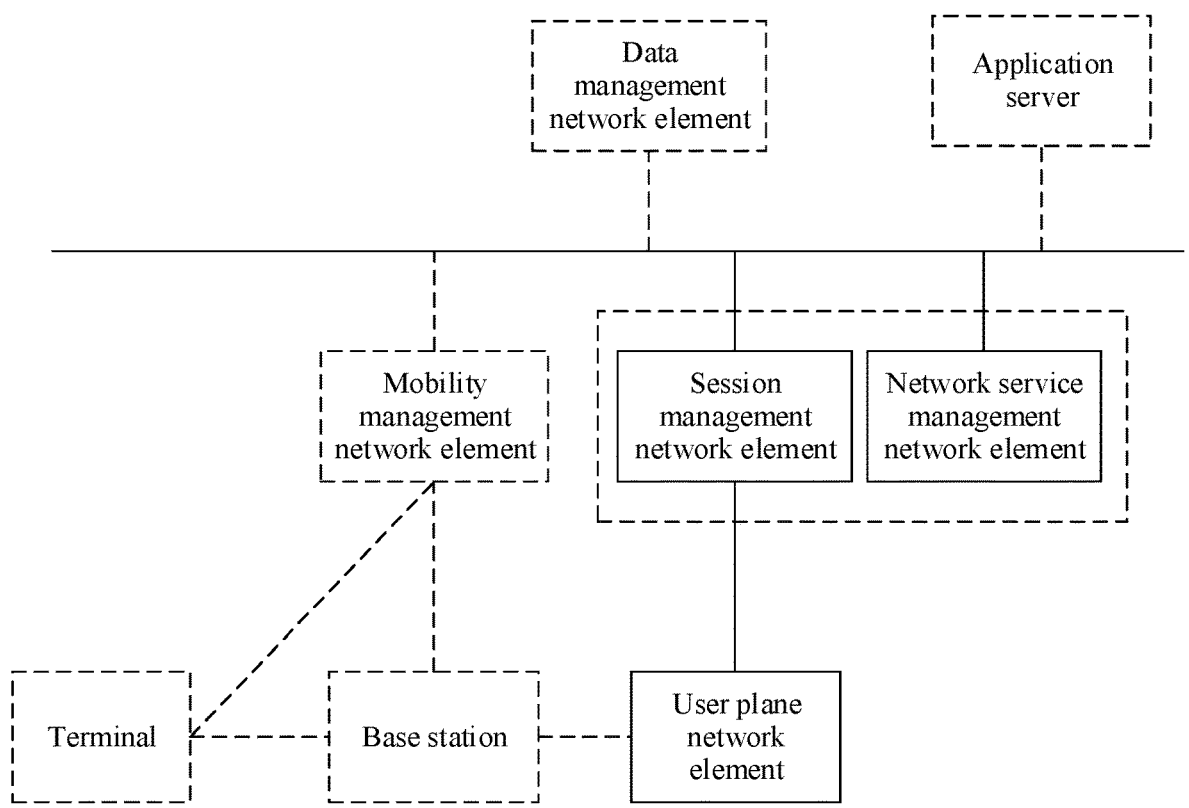
FIG. 1 is a schematic diagram of a possible network architecture according to this application.

FIG. 1 is a schematic diagram of a possible network architecture to which this application is applicable. The network architecture includes a user plane network element. Further, a session management network element and a network service management network element may be further included. Further, a base station, a mobility management network element, a data management network element, an application server, and the like may be further included.

The user plane network element is mainly responsible for processing a user packet, for example, forwarding, charging, and lawful interception, and may further receive data, identify a LAN group to which the data belongs, add a user plane LAN identifier to the data, and perform unicast, multicast, or broadcast forwarding based on the user plane LAN identifier. The user plane LAN identifier is used to isolate user plane data of different LAN groups. In a 5th generation (5G) network, the user plane network element may be a user plane function (UPF) network element. In future communication, for example, in a 6th generation (6G) network, the user plane network element may still be the UPF network element, or may have another name. This is not limited in this application.

The session management network element is mainly used for session management in a mobile network, for example, session creation, modification, and release. Specific functions include, for example, allocating an internet protocol (IP) address to a user, selecting a user plane network element that provides a packet forwarding function, requesting detailed information about a LAN service and the user plane LAN ID from the network service management network element when it is determined that a service initiated by a user is the LAN service, and generating a LAN identification rule and a forwarding rule based on a LAN service location and user plane LAN ID information and delivering the rules to the user plane network element through signaling. In 5G, the session management network element may be a session management function (SMF) network element. In future communication such as 6G, the session management network element may still be the SMF network element, or may have another name. This is not limited in this application.

The network service management network element may be configured to identify a group to which a user belongs, and create isolated group communication. Functions of the network service management network element specifically include: managing a border or a location of a LAN, that is, being able to select the user plane network element or collaboratively select the user plane network element with the session management network element; allocating a user plane LAN ID, such as a single VLAN ID in IEEE 802.11Q, a double VLAN ID in IEEE 802.1ad, or an RD in internet engineering task force (IETF) RFC (Request For Comments) 4364; and being able to generate the LAN identification rule and the forwarding rule or indicate the session management network element to generate the LAN identification rule and the forwarding rule. In 5G communication, the network service management network element may be referred to as a local area network service management function (LSMF) network element. In future communication such as 6G communication, the network service management network element may still be referred to as the LSMF network element, or may have another name. This is not limited in this application.

The mobility management network element is mainly used for registration, mobility management, and a tracking area update procedure for a terminal in a mobile network. The mobility management network element terminates a non-access stratum (NAS) message, completes registration management, connection management, and reachability management, tracking area list (TA list) allocation, mobility management, and the like, and transparently routes a session management (SM) message to the session management network element. In 5G communication, the mobility management network element may be an access and mobility management function (AMF) network element. In future communication such as 6G communication, the mobility management network element may still be the AMF network element, or have another name. This is not limited in this application.

The data management network element is mainly configured to store user data, such as subscription information and authentication/authorization information. In 5G, the data management network element may be a unified data management (UDM) network element. In future communication such as 6G, the data management network element may still be the UDM network element, or may have another name. This is not limited in this application.

The terminal is a device having a wireless transceiver function, may be deployed on land, and includes an indoor device, an outdoor device, a hand-held device, or a vehicle-mounted device. The terminal may also be deployed on a water surface (for example, on a ship), or may be deployed in air (for example, in an aircraft, a balloon, or a satellite). The terminal may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, and the like. In addition, the terminal may alternatively be user equipment (UE) or the like.

The base station is a device that provides a wireless communication function for a terminal. The base station is a device that provides a wireless communication function for the terminal. For example, the base station includes but is not limited to a next-generation NodeB (g NodeB, gNB) in 5G, an evolved NodeB (eNB), a radio network controller (RNC), a NodeB (NB), a base station controller (BSC), a base transceiver station (BTS), and a home base station (for example, a home evolved NodeB or a home NodeB, HNB).

It should be noted that, in specific implementation, the session management network element and the network service management network element may be two network elements that are physically independent, or may be merely two network elements that are obtained through division performed based on a logic function but physically belong to a same network element. Alternatively, a function of the network service management network element may be deployed in the session management network element. That is, the function of the network service management network element is added to the session management network element. In this application, when the session management network element and the network service management network element physically belong to the same network element, or the function of the network service management network element is deployed in the session management network element, a network element that has both a function of the session management network element and the function of the network service management network element may also be referred to as a first control plane network element.

It may be understood that the foregoing functions may be network elements in a hardware device, software functions running on dedicated hardware, or virtualized functions instantiated on a platform (for example, a cloud platform).

For ease of description, an example in which the user plane network element is the UPF network element, the network service management network element is the LSMF network element, the session management network element is the SMF network element, the mobility management network element is the AMF network element, the data management network element is the UDM network element, and the terminal is the UE is used for description below in this application. Further, the UPF network element is referred to as UPF for short, the LSMF network element is referred to as LSMF for short, the SMF network element is referred to as SMF for short, the AMF network element is referred to as AMF for short, and the UDM network element is referred to as UDM for short. To be specific, all UPFs may be replaced with user plane network elements, all LSMFs may be replaced with network service management network elements, all SMFs may be replaced with session management network elements, all AMFs may be replaced with mobility management network elements, all UDMs may be replaced with data management network elements, and all UEs may be replaced with terminals in description below in this application.

At present, the 3GPP proposes to create mutually isolated group communication for different LAN groups. A LAN service is based on a group granularity. The different LAN groups need to be isolated from each other in a user plane.

In this application, communication between UEs in a LAN group is separately described by using a user plane and a control plane of a core network.

Processing in the user plane mainly involves:
(1) forwarding processing on received data or a received packet, to send data or a packet sent by UE (for example, first UE) in the LAN group to another UE (for example, second UE) in the LAN group; and
(2) maintaining a virtual forwarding instance for each LAN group (which is uniquely identified by using a user plane LAN identifier in the user plane), where the virtual forwarding instance may be understood as a medium access control (MAC) forwarding table corresponding to a VLAN ID (that is, the user plane LAN ID is a VLAN ID), or may be understood as a VPN routing and forwarding table corresponding to an RD (that is, the user plane LAN ID is an RD), and the virtual forwarding instance is used to search for a forwarding port.

Processing in the control plane mainly involves:
(1) identifying that a service requested by UE is a LAN service;
(2) identifying a LAN group to which the UE belongs;
(3) allocating a user plane LAN identifier and a LAN identification rule to the UE; and
(4) selecting a proper UPF for the UE.

The following first describes a communication method in the user plane.

Figure 2:
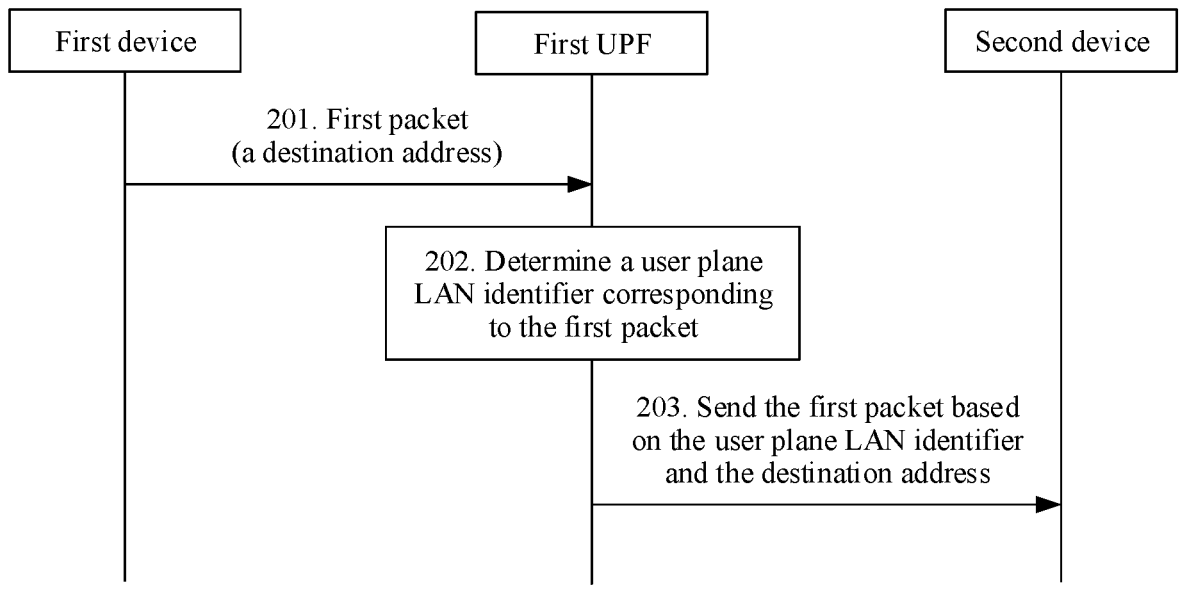
FIG. 2 is a schematic flowchart of a communication method according to this application.

FIG. 2 shows a communication method according to this application. The method is applied to a user plane. The method includes the following steps.

Step 201. A first device sends a first packet to a first UPF (which may also be referred to as a UPF 1). Correspondingly, the first UPF may receive the first packet.

The first device herein may be UE (for example, the UE may be referred to as first UE or UE 1), or may be another UPF (for example, the UPF may be referred to as a second UPF or a UPF 2). If the first device is the second UPF, the second UPF receives the first packet from another UPF or the first UE, and then sends the first packet to the first UPF.

The first UE herein is UE in a LAN group.

The first packet herein includes at least a destination address, and the destination address may be a unicast address or a multicast address. For example, when the first UE needs to send the first packet to one UE in the LAN group, the destination address included in the first packet is the unicast address. For another example, when the first UE needs to send the first packet to a plurality of UEs in the LAN group, the destination address included in the first packet may be the multicast address.

Step 202. The first UPF determines a user plane LAN identifier corresponding to the first packet, where the user plane LAN identifier is a user plane identifier of the LAN group.

The user plane LAN identifier herein may be used to uniquely identify the LAN group, and the user plane LAN identifier is used to identify the LAN group in the user plane. The user plane LAN identifier may also be referred to as a user plane LAN ID, a user plane 5G LAN ID, or the like.

In a control plane, an identifier of the LAN group may be used to uniquely identify the LAN group. The identifier of the LAN group may also be referred to as the LAN ID, the 5G LAN ID, a control plane LAN ID, a control plane 5G LAN ID, or the like.

In this step, that the first UPF determines a user plane LAN identifier corresponding to the first packet is identifying the LAN group to which the UE that sends the first packet belongs.

Step 203. The first UPF sends the first packet to a second device based on the user plane LAN identifier and the destination address in the first packet.

After determining the user plane LAN identifier corresponding to the first packet, the first UPF may send the first packet to the second device based on the user plane LAN identifier and the destination address in the first packet.

The second device herein is UE (for example, referred to as second UE or UE 2), or may be another UPF (for example, referred to as a third UPF or a UPF 3). If the second device is the third UPF, after receiving the first packet, the third UPF may further send the first packet to another UE (for example, the second UE) or to another UPF (for example, a fourth UPF or referred to as a UPF 4). Then, the fourth UPF sends the first packet to the second UE.

It should be noted that when the destination address included in the first packet is the multicast address, the second device may be a plurality of UEs or UPFs.

Based on the solution, after receiving the first packet from the first device (which may be the first UE or the second UPF), the first UPF determines the user plane LAN identifier corresponding to the first packet, where the user plane LAN identifier is an identifier that is in the user plane and that is of the LAN group to which the UE belongs, and one user plane LAN identifier corresponds to one LAN group. Then, the first UPF sends the first packet to the second device (which may be the second UE or the third UPF) based on the user plane LAN identifier and the destination address included in the first packet. Therefore, the first packet sent by one UE in the LAN group is sent to another UE in the LAN group.

The following describes different specific implementation methods of the embodiment shown in FIG. 2.

In an implementation, when user plane data (for example, the first packet) is an Ethernet frame, the user plane LAN identifier may be a single VLAN ID. For details, refer to IEEE 802.1q and IEEE 802.1ad. When user plane data (for example, the first packet) is an Ethernet frame, the user plane LAN identifier may be a double VLAN ID. For details, refer to IEEE 802.1q and IEEE 802.1ad. When user plane data (for example, the first packet) is an IP packet, the user plane LAN identifier may be an RD. For details, refer to IETF RFC 4364.

In an implementation, a user plane LAN identifier of the first UPF may be obtained by the first UPF from the control plane. For example, a first control plane network element sends the user plane LAN identifier to the first UPF.

In an implementation, a LAN identification rule is installed or configured on the first UPF. The LAN identification rule may be obtained by the first UPF from the control plane. For example, the first control plane network element may send the LAN identification rule to the first UPF. The LAN identification rule herein may include either or both of the following correspondences:

(1) a correspondence between flow characteristic information and the user plane LAN identifier, where the flow characteristic information herein may be, for example, a session identifier (for example, may be an N4 session identifier), a session identifier and a QFI, a TEID, or a TEID and a QFI; and (2) a correspondence between an identifier of a tunnel and the user plane LAN identifier, where the identifier of the tunnel herein may be, for example, an identifier of an N9 tunnel or an identifier of an N6 tunnel.

Therefore, a specific implementation of the foregoing step 202 may be, for example, as follows: If the first device is the first UE, that is, the first UPF receives the first packet from the first UE, that the first UPF determines a user plane LAN identifier corresponding to the first packet specifically includes: The first UPF determines flow characteristic information of the first packet, and then determines the user plane LAN identifier corresponding to the first packet according to a LAN identification rule. The LAN identification rule herein includes the correspondence between the flow characteristic information and the user plane LAN identifier. If the first device is the second UPF, that is, the first UPF receives the first packet from the second UPF, and specifically, receives the first packet through a tunnel between the first UPF and the second UPF, that the first UPF determines a user plane LAN identifier corresponding to the first packet specifically includes: The first UPF determines an identifier of a tunnel for receiving the first packet, and then determines the user plane LAN identifier corresponding to the first packet according to a LAN identification rule. The LAN identification rule herein includes the correspondence between the identifier of the tunnel and the user plane LAN identifier.

In a possible implementation, in the foregoing step 203, that the first UPF sends the first packet to a second device based on the user plane LAN identifier and the destination address in the first packet specifically includes: The first UPF determines, based on the user plane LAN identifier, a virtual forwarding instance corresponding to the user plane LAN identifier, where the virtual forwarding instance includes a correspondence between the destination address and a forwarding port, and the forwarding port corresponds to the second device; the first UPF determines the forwarding port based on the virtual forwarding instance; and the first UPF sends the first packet to the second device through the forwarding port.

The following describes a specific implementation method of the virtual forwarding instance by using an example with reference to a table. Table 1 is an example table of the virtual forwarding instance of the first UPF. An example in which the destination address is a MAC address is used. Certainly, the destination address may alternatively be another address, for example, an IP address.

TABLE 1

| Virtual forwarding instance 1 (user plane LAN ID 1) | | Virtual forwarding instance 2 (user plane LAN ID 2) | |
| --- | --- | --- | --- |
| Destination address | Forwarding port | Destination address | Forwarding port |
| MAC 1 | N4 session port 1 | MAC 5 | N4 session port 3 |
| MAC 2 | N4 session port 2 | MAC 6 | N4 session port 4 |

TABLE 1-continued

| Virtual forwarding instance 1 (user plane LAN ID 1) | | Virtual forwarding instance 2 (user plane LAN ID 2) | |
|---|---|---|---|
| Destination address | Forwarding port | Destination address | Forwarding port |
| MAC 3 | Tunnel port 1 | MAC 7 | Tunnel port 3 |
| MAC 4 | Tunnel port 2 | MAC 8 | Tunnel port 4 |
| ... | ... | ... | ... |

As shown in Table 1, two virtual forwarding instances are included, and are respectively the virtual forwarding instance 1 and the virtual forwarding instance 2. The user plane LAN ID 1 uniquely identifies the virtual forwarding instance 1, and the user plane LAN ID 2 uniquely identifies the virtual forwarding instance 2.

In an example, if the first UPF determines, after receiving the first packet, that the user plane LAN identifier corresponding to the first packet is the user plane LAN ID 1, and the destination address included in the first packet is the MAC 1, the first UPF searches for, based on the user plane LAN ID 1, a forwarding port, namely, the N4 session port 1, corresponding to the MAC 1 in the virtual forwarding instance 1, and the first UPF sends the received first packet to the second device through the N4 session port 1. The second device is another UE, for example, the UE 2.

In another example, if the first UPF determines, after receiving the first packet, that the user plane LAN identifier corresponding to the first packet is the user plane LAN ID 2, and the destination address included in the first packet is the MAC 7, the first UPF searches for, based on the user plane LAN ID 2, a forwarding port, namely, the tunnel port 3, corresponding to the MAC 7 in the virtual forwarding instance 2, and the first UPF sends the received first packet to the second device through the tunnel port 3. The second device is another UPF, for example, the UPF 3.

In specific implementation, a virtual forwarding instance may be a MAC forwarding table marked with a VLAN ID (that is, the user plane LAN ID is the VLAN ID), or may be a VPN routing and forwarding table (VRF) marked with a route distinguisher (RD) (that is, the user plane LAN ID is the RD)

The following describes the foregoing implementation method in detail with reference to the accompanying drawings. It should be noted that the first UE is equivalent to the UE 1, the second UE is equivalent to the UE 2, the first UPF is equivalent to the UPF 1, the second UPF is equivalent to the UPF 2, the third UPF is equivalent to the UPF 3, and the fourth UPF is equivalent to the UPF 4 in description below in this application.

Figure 3A:
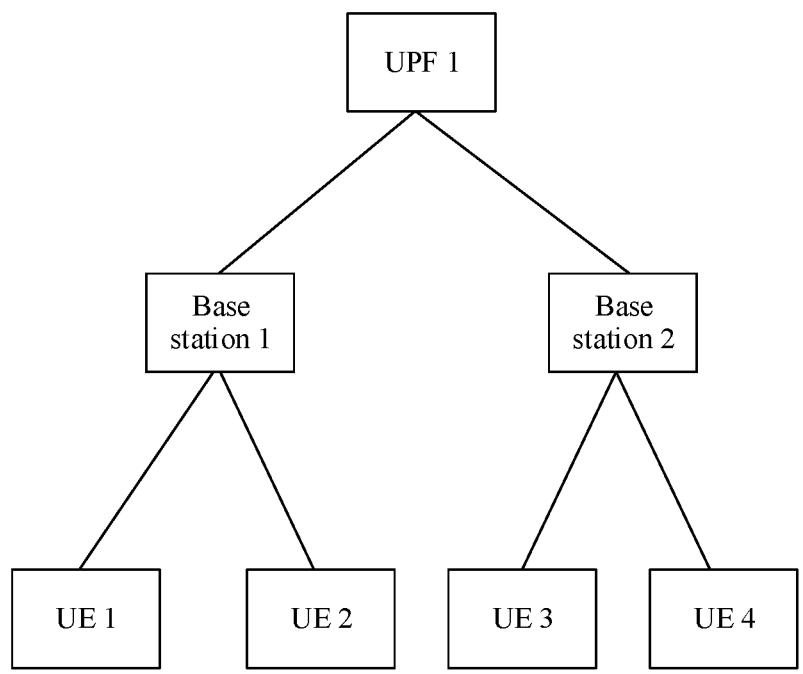
FIG. 3(a) is a schematic diagram of a first connection relationship of UEs in a LAN group in a user plane according to this application.
Figure 3B:
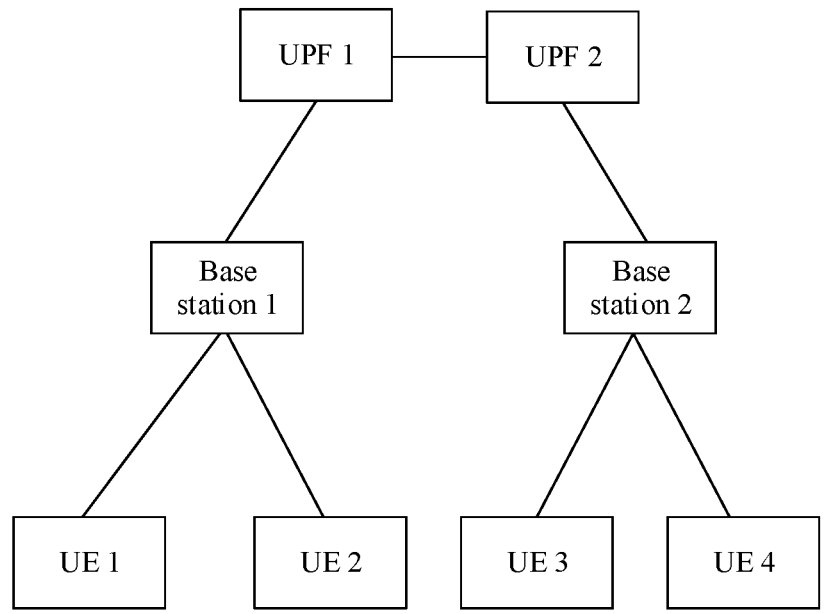
FIG. 3(b) is a schematic diagram of a second connection relationship of UEs in a LAN group in a user plane according to this application.

Using an example in which a LAN group 1 includes the UE 1, the UE 2, UE 3, and UE 4, there are two connection relationships in the user plane. FIG. 3(*a*) is a schematic diagram of a first connection relationship of UEs in a LAN group in a user plane. The UEs in the LAN group are connected to a same UPF. As shown in the figure, the UE 1 to the UE 4 are connected to the UPF 1. When the UEs in the LAN group need to communicate with each other, the UPF 1 may be used to forward a packet or data in the user plane. FIG. 3(*b*) is a schematic diagram of a second connection relationship of UEs in a LAN group in a user plane. The UEs in the LAN group are connected to a plurality of UPFs (two UPFs are used as an example in the figure). As shown in the figure, the UE 1 and the UE 2 are connected to the UPF 1, and the UE 3 and the UE 4 are connected to the UPF 2. When the UEs in the LAN group need to communicate with each other, the UPF 1 and the UPF 2 need to be used to forward a packet or data in the user plane.

Figure 4A:
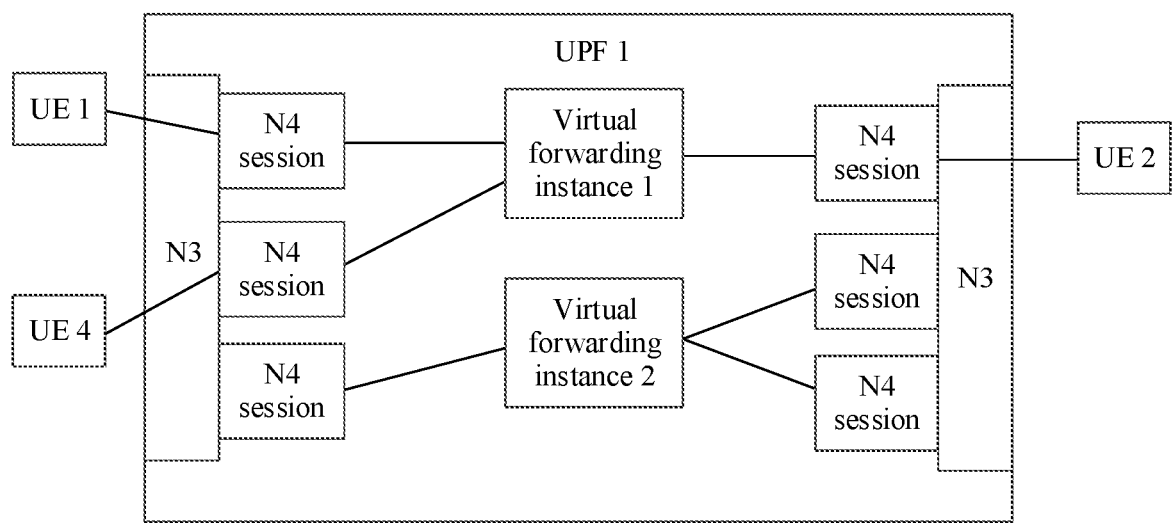
FIG. 4(a) is an example diagram of UPF forwarding according to this application.
Figure 4B:
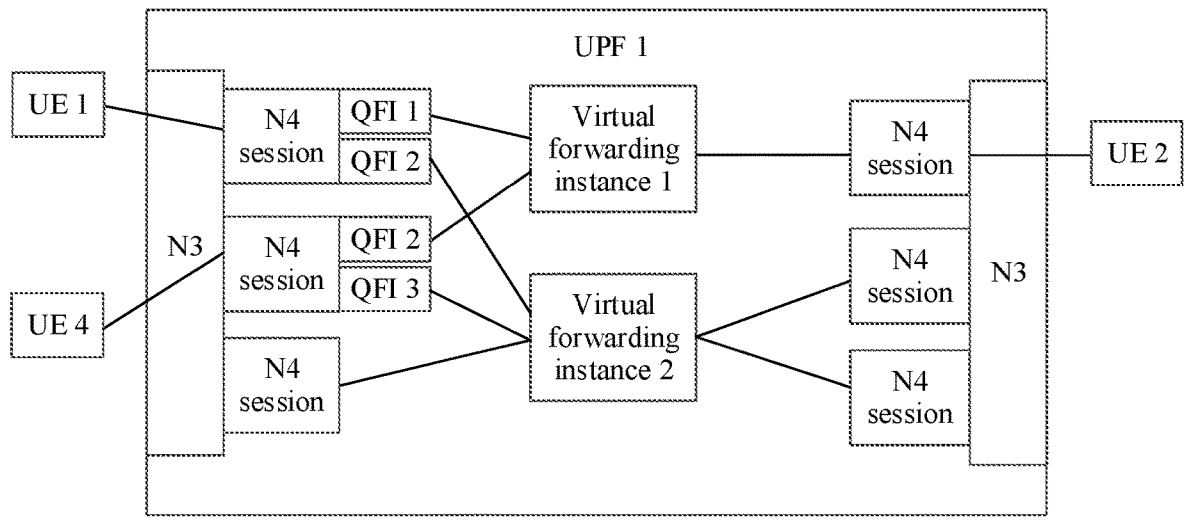
FIG. 4(b) is another example diagram of UPF forwarding according to this application.

FIG. 4(*a*) is an example diagram of UPF forwarding. The UPF 1 receives data or a packet from UE, and then sends the data or the packet to UE. A LAN identification rule on the UPF 1 includes a correspondence between an N4 session identifier and a user plane LAN identifier. For example, if the UPF 1 receives a first packet from the UE 1 from an N4 session port, may determine, by using the N4 session port through which the first packet is received, an N4 session identifier corresponding to the first packet, and then determine, according to the LAN identification rule, a user plane LAN identifier corresponding to the first packet, for example, a user plane LAN ID 1, the UPF 1 searches for a virtual forwarding instance 1 based on a destination MAC address in the first packet, to learn that a forwarding port is an N4 session port corresponding to the UE 2. That is, the UPF 1 sends the first packet to the UE 2.

FIG. 4(*b*) is another example diagram of UPF forwarding. The UPF 1 receives data or a packet from UE, and then sends the data or the packet to UE. A LAN identification rule on the UPF 1 includes a correspondence between both an N4 session identifier and a QFI and a user plane LAN identifier. For example, if the UPF 1 receives a first packet from the UE 1 from an N4 session port, may determine, by using the N4 session port through which the first packet is received and a QFI in the first packet, an N4 session identifier and the QFI (for example, a QFI 1) that correspond to the first packet, and then determine, according to the LAN identification rule, a user plane LAN identifier corresponding to the first packet, for example, a user plane LAN ID 2, the UPF 1 searches for a virtual forwarding instance 1 based on a destination MAC address in the first packet, to learn that a forwarding port is an N4 session port corresponding to the UE 2. That is, the UPF 1 sends the first packet to the UE 2.

Figure 5A:
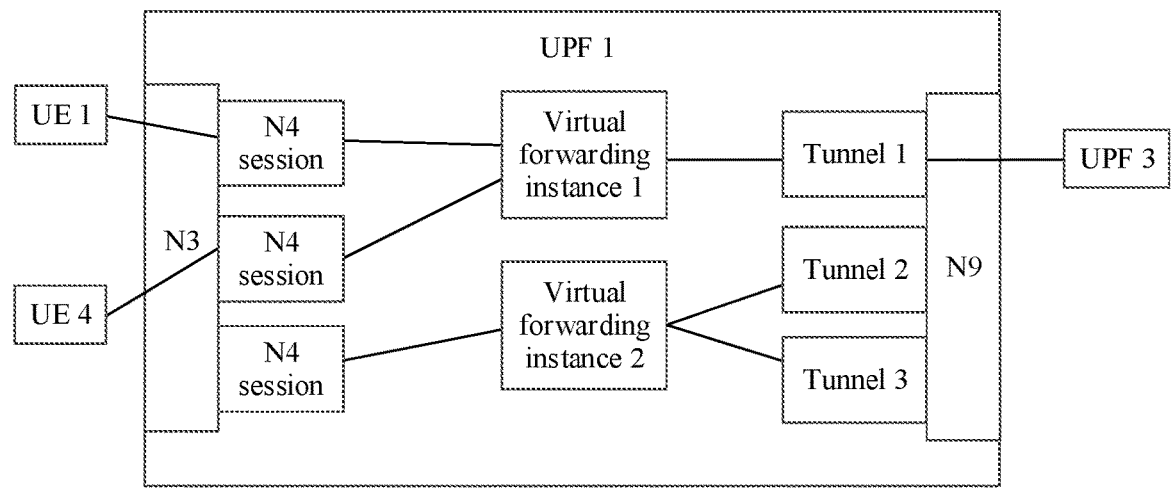
FIG. 5(a) is another example diagram of UPF forwarding according to this application.
Figure 5B:
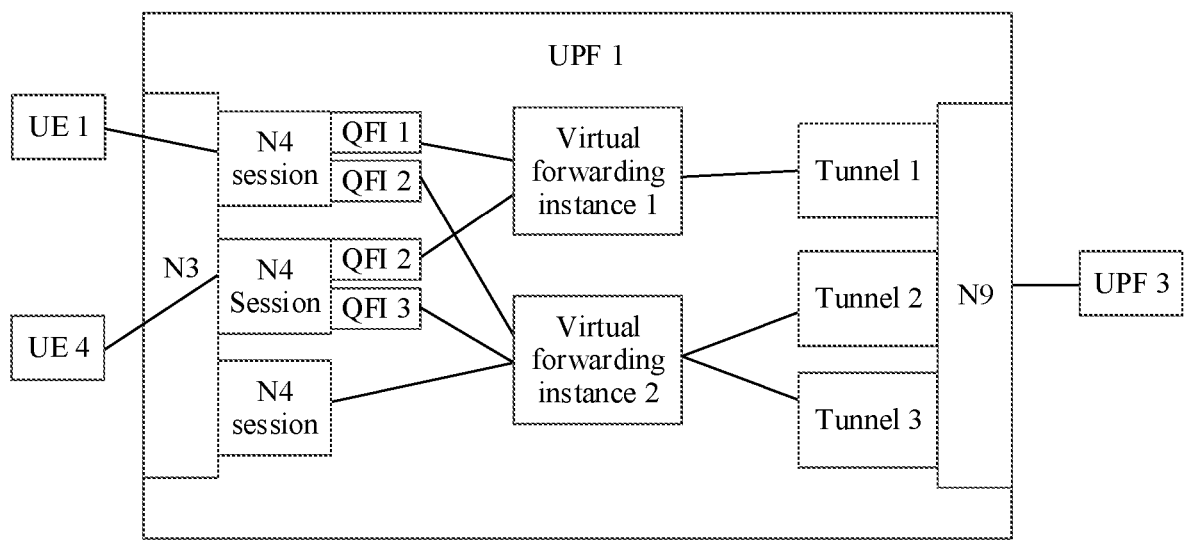
FIG. 5(b) is another example diagram of UPF forwarding according to this application.

FIG. 5(*a*) is another example diagram of UPF forwarding. The UPF 1 receives data or a packet from UE, and then sends the data or the packet to a UPF. A LAN identification rule on the UPF 1 includes a correspondence between an N4 session identifier and a user plane LAN identifier. For example, if the UPF 1 receives a first packet from the UE 1 from an N4 session port, may determine, by using the N4 session port through which the first packet is received, an N4 session identifier corresponding to the first packet, and then determine, according to the LAN identification rule, a user plane LAN identifier corresponding to the first packet, for example, a user plane LAN ID 1, the UPF 1 searches for a virtual forwarding instance 1 based on a destination MAC address in the first packet, to learn that a forwarding port is an N9 tunnel port 1 corresponding to the UPF 3. That is, the UPF 1 sends the first packet to the UPF 3.

FIG. 5(*b*) is another example diagram of UPF forwarding. The UPF 1 receives data or a packet from UE, and then sends the data or the packet to a UPF. A LAN identification rule on the UPF 1 includes a correspondence between both an N4 session identifier and a QFI and a user plane LAN identifier. For example, if the UPF 1 receives a first packet from the UE 1 from an N4 session port, may determine, by using the N4 session port through which the first packet is received and a QFI in the first packet, an N4 session identifier and the QFI (for example, a QFI 1) that correspond to the first packet, and then determine, according to the LAN identification rule, a user plane LAN identifier corresponding to the first packet, for example, a user plane LAN ID 2, the UPF 1 searches for a virtual forwarding instance 1 based on a destination MAC address in the first packet, to learn that a forwarding port is an N9 tunnel port 1 corresponding to the UPF 3. That is, the UPF 1 sends the first packet to the UPF 3.

In the foregoing embodiments, isolated LAN group communication is implemented by using user plane LAN identifiers. Each LAN group corresponds to one user plane LAN identifier, and forwarding tables and ports of different LAN groups are distinguished from each other by using the user plane LAN identifiers, to achieve an objective of isolation. The UPF forwards the marked user plane data or packet, and selects a forwarding port based on the user plane LAN identifier and the destination MAC address. If there are a plurality of forwarding ports, the user plane data or packet is duplicated into a plurality of copies, and one copy is sent to each port. That is, multicast or broadcast is implemented.

The following describes a communication method in a control plane.

That an LSMF and an SMF are two independent network elements is used as an example for description below.

Figure 6:
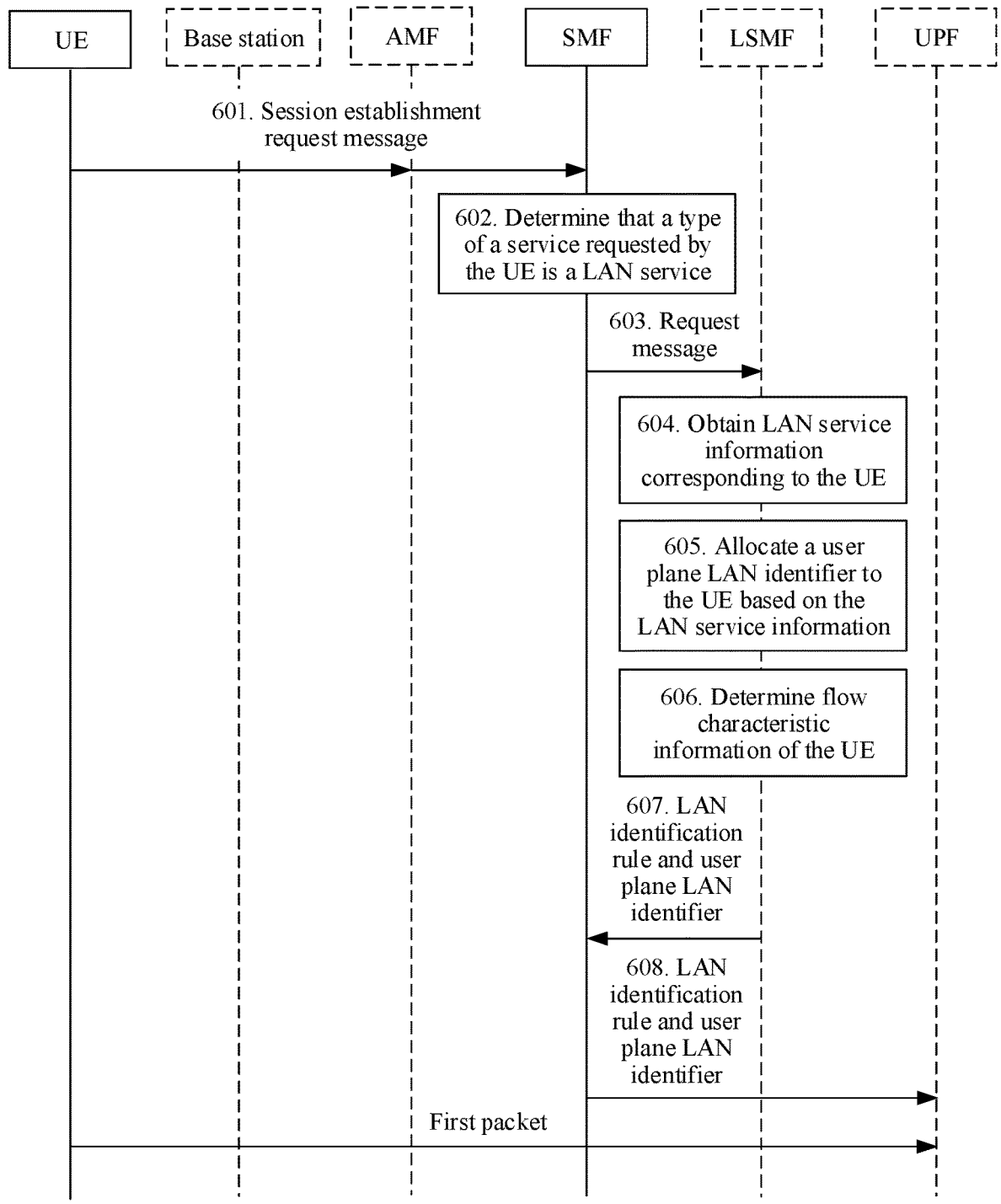
FIG. 6 is a schematic flowchart of another communication method according to this application.

FIG. 6 shows a communication method according to this application. The method may be used to establish group communication for UE. The method includes the following steps.

Step 601. An SMF receives a session establishment request message from the UE, where the session establishment request message includes a UE identifier.

The session establishment request message may be, for example, a PDU session establishment request message. The session establishment request message includes the UE identifier, and may further include an identifier of a PDU session, and the session establishment request message is used to request to establish the PDU session.

In specific implementation, the UE may send the session establishment request message to an AMF, and then the AMF sends the session establishment request message to the SMF.

Step 602. The SMF determines that a type of a service requested by the UE is a LAN service.

Optionally, the SMF may determine, by using the following method, that the type of the service requested by the UE is the LAN service:

Method 1: The session establishment request message includes the type of the service requested by the UE, and the type of the service is the LAN service.

Based on the method, the SMF may determine, based on the type of the service requested by the UE in the session establishment request message, that the type of the service requested by the UE is the LAN service.

Optionally, the session establishment request message may further include an identifier, for example, a LAN ID, that is of a LAN group to which the UE belongs.

Method 2: The SMF sends a subscription information request message to a UDM, where the subscription information request message includes the UE identifier. The UDM sends a subscription information response message to the SMF based on the subscription information request message, where the subscription information response message indicates that the UE has subscribed to the LAN service. In this case, the SMF may determine, based on the subscription information response message, that the type of the service requested by the UE is the LAN service.

Step 603. The SMF sends a request message to the LSMF, where the request message includes the UE identifier, and the request message is used to request the LAN service.

Step 604. The LSMF obtains LAN service information corresponding to the UE, where the LAN service information includes the identifier of the LAN group corresponding to the UE.

Further, the LAN service information may further include member information of the LAN group. The member information herein may be, for example, an identifier of another UE, namely, an identifier of current UE in the LAN group. Alternatively, the member information may be location information. That is, the member information is used to indicate that as long as a current location of UE falls within coverage of location information of the LAN group, the UE may join the LAN group. Alternatively, the member information may be a UE type. That is, the member information is used to indicate that as long as a type of UE is the same as a type indicated by a UE type of the LAN group, the UE may join the LAN group.

Optionally, the LSMF may obtain, by using the following method, the LAN service information corresponding to the UE.

Method 1: The LSMF locally obtains the LAN service information corresponding to the UE.

For example, if the LSMF locally stores the LAN service information of the UE, the LSMF may first locally obtain the LAN service information of the UE.

Method 2: The LSMF obtains the LAN service information corresponding to the UE from the UDM.

For example, the LSMF may send a query request to the UDM to obtain the LAN service information of the UE.

Method 3: The LSMF obtains the LAN service information corresponding to the UE from an application server.

The application server may be, for example, an application function (AF) server, and belongs to an external server. When the external server stores the LAN service information, the LSMF may also obtain the LAN service information of the UE from the application server.

Method 4: If the request message sent by the SMF to the LSMF includes the identifier of the LAN group, the LSMF may obtain, from the request message, the LAN service information corresponding to the UE. The LAN service information herein refers to the identifier of the LAN group. Further, the LSMF may obtain other LAN service information, for example, member information, by using the foregoing method 1, method 2, or method 3.

Step 605. The LSMF allocates a user plane LAN identifier to the UE based on the LAN service information.

Step 606. The LSMF determines flow characteristic information of the UE.

The flow characteristic information herein is a session identifier, a session identifier and a QFI, a TEID, or a TEID and a QFI.

It should be noted that step 606 may be performed in any step after step 603 and before step 607. This is not limited in this application.

Further, an identifier of a tunnel may be further determined in this application. The tunnel herein is a tunnel between different UPFs.

Step 607. The LSMF sends a LAN identification rule and the user plane LAN identifier to the SMF.

The LAN identification rule herein includes a correspondence between the flow characteristic information and the user plane LAN identifier.

Further, the LAN identification rule may further include a correspondence between the identifier of the tunnel and the user plane LAN identifier.

Step 608. The SMF sends the LAN identification rule and the user plane LAN identifier to a UPF.

The LAN identification rule includes the correspondence between the flow characteristic information and the user plane LAN identifier. Further, the LAN identification rule may further include the correspondence between the identifier of the tunnel and the user plane LAN identifier.

Further, in the foregoing embodiment, the SMF or the LSMF may further select the UPF for the UE. For example, if the SMF selects the UPF, the SMF may select the UPF for the UE after step 601 and before step 608. For another example, if the LSMF selects the UPF, the LSMF may select the UPF for the UE after step 604 and before step 607 based on a distribution location of a UPF selected by the LAN group, and may further send an identifier of the selected UPF to the SMF.

Based on the foregoing embodiment, the LSMF may determine an identifier, namely, the user plane LAN identifier, that is in a user plane and that is of the LAN group corresponding to the UE, and then send the LAN identification rule and the user plane LAN identifier that correspond to the UE to the SMF, and then the SMF sends the received LAN identification rule and user plane LAN identifier to the UPF. Therefore, the UPF may process a packet from the UE based on the LAN identification rule and the user plane LAN identifier.

Figure 7:
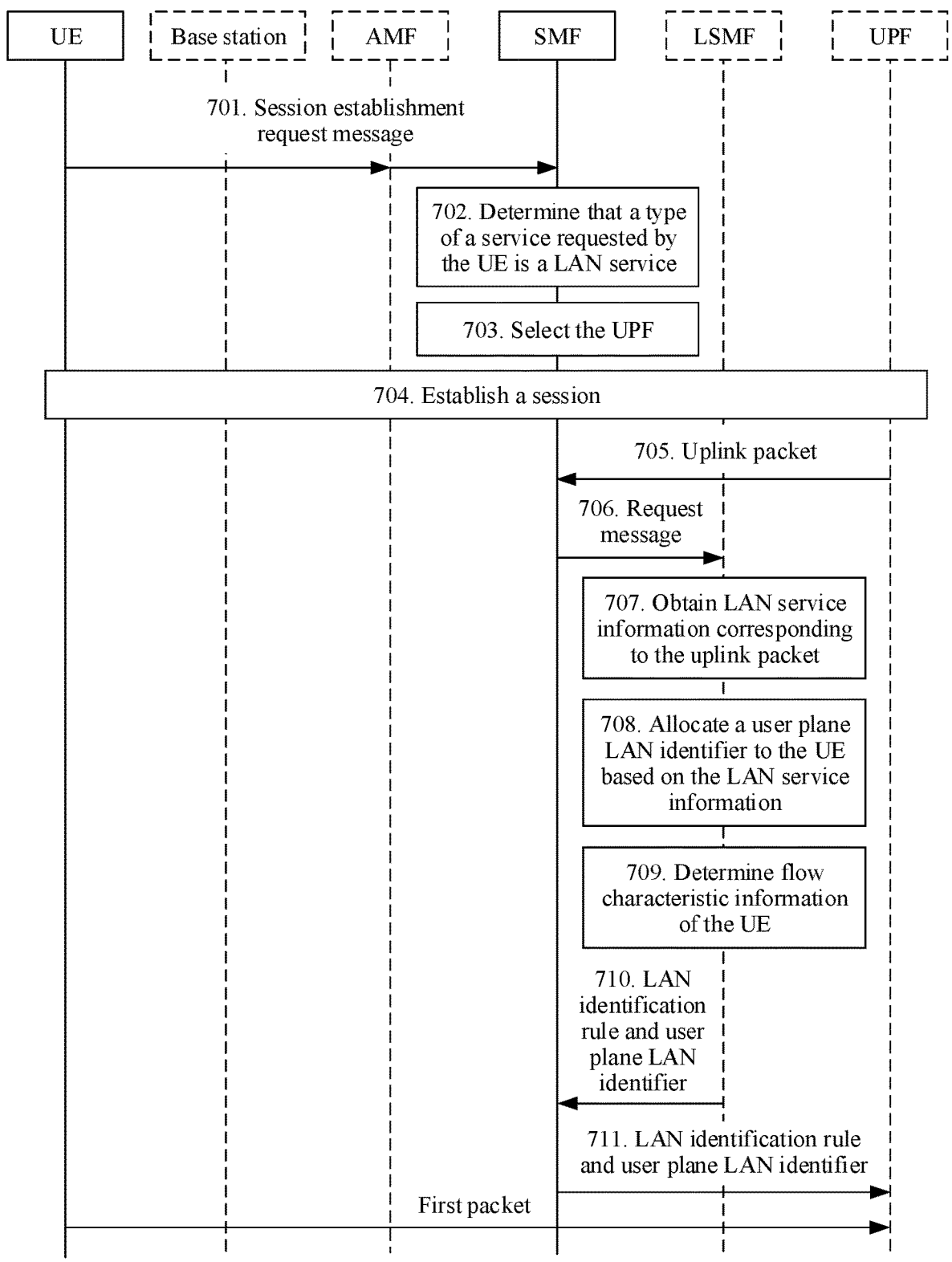
FIG. 7 is a schematic flowchart of another communication method according to this application.

FIG. 7 shows another communication method according to this application. The method may be used to establish group communication for UE. The method includes the following steps.

Step 701. An SMF receives a session establishment request message from the UE, where the session establishment request message includes a UE identifier.

The session establishment request message may be, for example, a PDU session establishment request message. The session establishment request message includes the UE identifier, and may further include an identifier of a PDU session, and the session establishment request message is used to request to establish the PDU session.

In specific implementation, the UE may send the session establishment request message to an AMF, and then the AMF sends the session establishment request message to the SMF.

Step 702. The SMF determines that a type of a service requested by the UE is a LAN service.

Further, the SMF records that a session of the UE is associated with the LAN service.

Optionally, the SMF may determine, by using the following method, that the type of the service requested by the UE is the LAN service:

The SMF sends a subscription information request message to a UDM, where the subscription information request message includes the UE identifier. The UDM sends a subscription information response message to the SMF based on the subscription information request message, where the subscription information response message indicates that the UE has subscribed to the LAN service. In this case, the SMF may determine, based on the subscription information response message, that the type of the service requested by the UE is the LAN service.

Step 703. The SMF selects a UPF for the UE.

Step 704. A session is established between the UE and the UPF.

After the SMF selects the UPF for the UE, the session is established between the UE and the UPF, so that the UE may send an uplink packet to the UPF.

Step 705. The UPF sends the uplink packet to the SMF.

After receiving the uplink packet sent by the UE, the UPF sends the uplink packet to the SMF.

Step 706. The SMF sends a request message to an LSMF. The request message includes an identifier of the UPF and packet information, the packet information includes the uplink packet or partial information of the uplink packet, and the request message is used to request a LAN service corresponding to the uplink packet.

Step 707. The LSMF obtains LAN service information corresponding to the uplink packet, where the LAN service information includes an identifier of a LAN group corresponding to the UE.

Further, the LAN service information may further include member information of the LAN group. The member information herein may be, for example, an identifier of another UE, namely, an identifier of current UE in the LAN group. Alternatively, the member information may be location information. That is, the member information is used to indicate that as long as a current location of UE falls within coverage of location information of the LAN group, the UE may join the LAN group. Alternatively, the member information may be a UE type. That is, the member information is used to indicate that as long as a type of UE is the same as a type indicated by a UE type of the LAN group, the UE may join the LAN group.

Optionally, the LSMF may obtain, by using the following method, the LAN service information corresponding to the uplink packet.

Method 1: The LSMF locally obtains the LAN service information corresponding to the uplink packet.

For example, if the LSMF locally stores the LAN service information of the uplink packet, the LSMF may first locally obtain the LAN service information of the uplink packet.

Method 2: The LSMF obtains the LAN service information corresponding to the uplink packet from the UDM.

For example, the LSMF may send a query request to the UDM to obtain the LAN service information of the uplink packet.

Method 3: The LSMF obtains the LAN service information corresponding to the uplink packet from an application server.

The application server may be, for example, an AF server, and belongs to an external server. When the external server stores the LAN service information, the LSMF may also obtain the LAN service information from the application server.

Step 708. The LSMF allocates a user plane LAN identifier to the UE based on the LAN service information.

Step 709. The LSMF determines flow characteristic information of the UE.

The flow characteristic information herein is a session identifier, a session identifier and a QFI, a TEID, or a TEID and a QFI.

It should be noted that step 709 may be performed in any step after step 706 and before step 710. This is not limited in this application.

Further, an identifier of a tunnel may be further determined in this application. The tunnel herein is a tunnel between different UPFs.

Step 710. The LSMF sends a LAN identification rule and the user plane LAN identifier to the SMF.

The LAN identification rule herein includes a correspondence between the flow characteristic information and the user plane LAN identifier.

Further, the LAN identification rule may further include a correspondence between the identifier of the tunnel and the user plane LAN identifier.

Step 711. The SMF sends the LAN identification rule and the user plane LAN identifier to the UPF.

The LAN identification rule includes the correspondence between the flow characteristic information and the user plane LAN identifier. Further, the LAN identification rule may further include the correspondence between the identifier of the tunnel and the user plane LAN identifier.

Based on the foregoing embodiment, the LSMF may determine an identifier, namely, the user plane LAN identifier, that is in a user plane and that is of the LAN group corresponding to the UE, and then send the LAN identification rule and the user plane LAN identifier that correspond to the UE to the SMF, and then the SMF sends the received LAN identification rule and user plane LAN identifier to the UPF. Therefore, the UPF may process a packet from the UE based on the LAN identification rule and the user plane LAN identifier.

Figure 8:
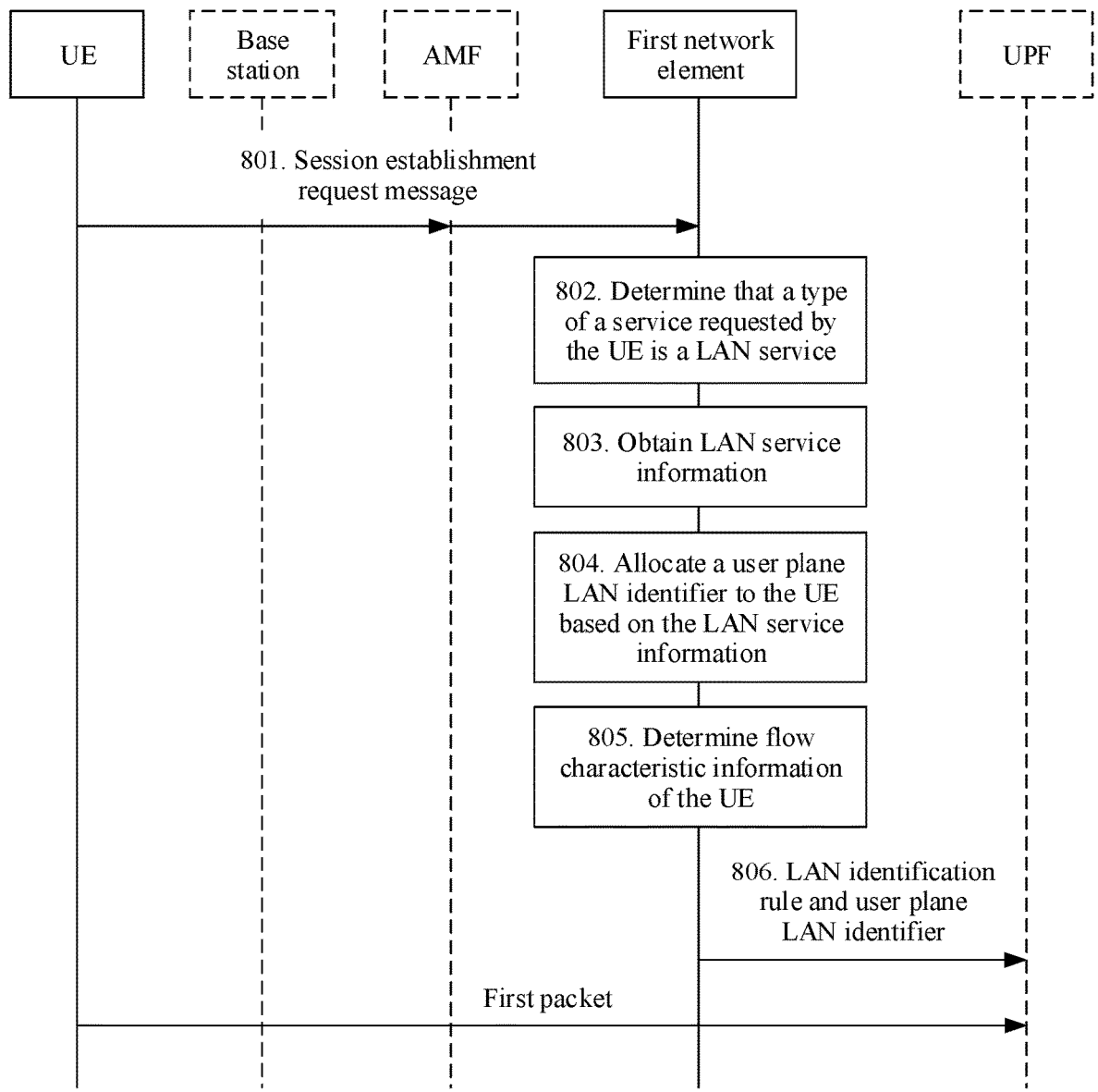
FIG. 8 is a schematic flowchart of another communication method according to this application.

It should be noted that if functions of the SMF and the LSMF are implemented by using one network element (referred to as a first control plane network element), this application further provides another communication method. As shown in FIG. 8, the method includes the following steps.

Step 801. A first control plane network element receives a session establishment request message from UE, where the session establishment request message includes a UE identifier.

The session establishment request message may be, for example, a PDU session establishment request message. The session establishment request message includes the UE identifier, and may further include an identifier of a PDU session, and the session establishment request message is used to request to establish the PDU session.

In specific implementation, the UE may send the session establishment request message to an AMF, and then the AMF sends the session establishment request message to the first control plane network element.

Step 802. The first control plane network element determines that a type of a service requested by the UE is a LAN service.

Optionally, the first control plane network element may determine, by using the following method, that the type of the service requested by the UE is the LAN service:

Method 1: The session establishment request message includes the type of the service requested by the UE, and the type of the service is the LAN service.

Based on the method, the first control plane network element may determine, based on the type of the service requested by the UE in the session establishment request message, that the type of the service requested by the UE is the LAN service.

Optionally, the session establishment request message may further include an identifier, for example, a LAN ID, that is of a LAN group to which the UE belongs.

Method 2: The first control plane network element sends a subscription information request message to a UDM, where the subscription information request message includes the UE identifier. The UDM sends a subscription information response message to the first control plane network element based on the subscription information request message, where the subscription information response message indicates that the UE has subscribed to the LAN service. In this case, the first control plane network element may determine, based on the subscription information response message, that the type of the service requested by the UE is the LAN service.

Step 803. The first control plane network element obtains LAN service information corresponding to the UE, where the LAN service information includes the identifier of the LAN group corresponding to the UE.

Further, the LAN service information may further include member information of the LAN group. The member information herein may be, for example, an identifier of another UE, namely, an identifier of current UE in the LAN group. Alternatively, the member information may be location information. That is, the member information is used to indicate that as long as a current location of UE falls within coverage of location information of the LAN group, the UE may join the LAN group. Alternatively, the member information may be a UE type. That is, the member information is used to indicate that as long as a type of UE is the same as a type indicated by a UE type of the LAN group, the UE may join the LAN group.

Optionally, the first control plane network element may obtain, by using the following method, the LAN service information corresponding to the UE.

Method 1: The first control plane network element locally obtains the LAN service information corresponding to the UE.

For example, if the first control plane network element locally stores the LAN service information of the UE, the first control plane network element may first locally obtain the LAN service information of the UE.

Method 2: The first control plane network element obtains the LAN service information corresponding to the UE from the UDM.

For example, the first control plane network element may send a query request to the UDM to obtain the LAN service information of the UE.

Method 3: The first control plane network element obtains the LAN service information corresponding to the UE from an application server.

The application server may be, for example, an AF server, and belongs to an external server. When the external server stores the LAN service information, the first control plane network element may also obtain the LAN service information of the UE from the application server.

Step 804. The first control plane network element allocates a user plane LAN identifier to the UE based on the LAN service information.

Step 805. The first control plane network element determines flow characteristic information of the UE.

The flow characteristic information herein is a session identifier, a session identifier and a QFI, a TEID, or a TEID and a QFI.

It should be noted that step 805 may be performed in any step after step 801 and before step 806. This is not limited in this application.

Further, the first control plane network element in this application may further determine an identifier of a tunnel. The tunnel herein is a tunnel between different UPFs.

Step 806. The first control plane network element sends a LAN identification rule and the user plane LAN identifier to a UPF.

The LAN identification rule includes a correspondence between the flow characteristic information and the user plane LAN identifier. Further, the LAN identification rule may further include a correspondence between the identifier of the tunnel and the user plane LAN identifier.

Further, in the foregoing embodiment, the first control plane network element may further select the UPF for the UE. The first control plane network element may select the UPF for the UE after step 802 and before step 806 based on a distribution location of a UPF selected by the LAN group.

Based on the foregoing embodiment, the first control plane network element may determine an identifier, namely, the user plane LAN identifier, that is in a user plane and that is of the LAN group corresponding to the UE, and then send the LAN identification rule and the user plane LAN identifier that correspond to the UE to the UPF. Therefore, the UPF may process a packet from the UE based on the LAN identification rule and the user plane LAN identifier.

The following specifically describes, with reference to specific embodiments, a communication method in a control plane provided in this application.

Figure 9:
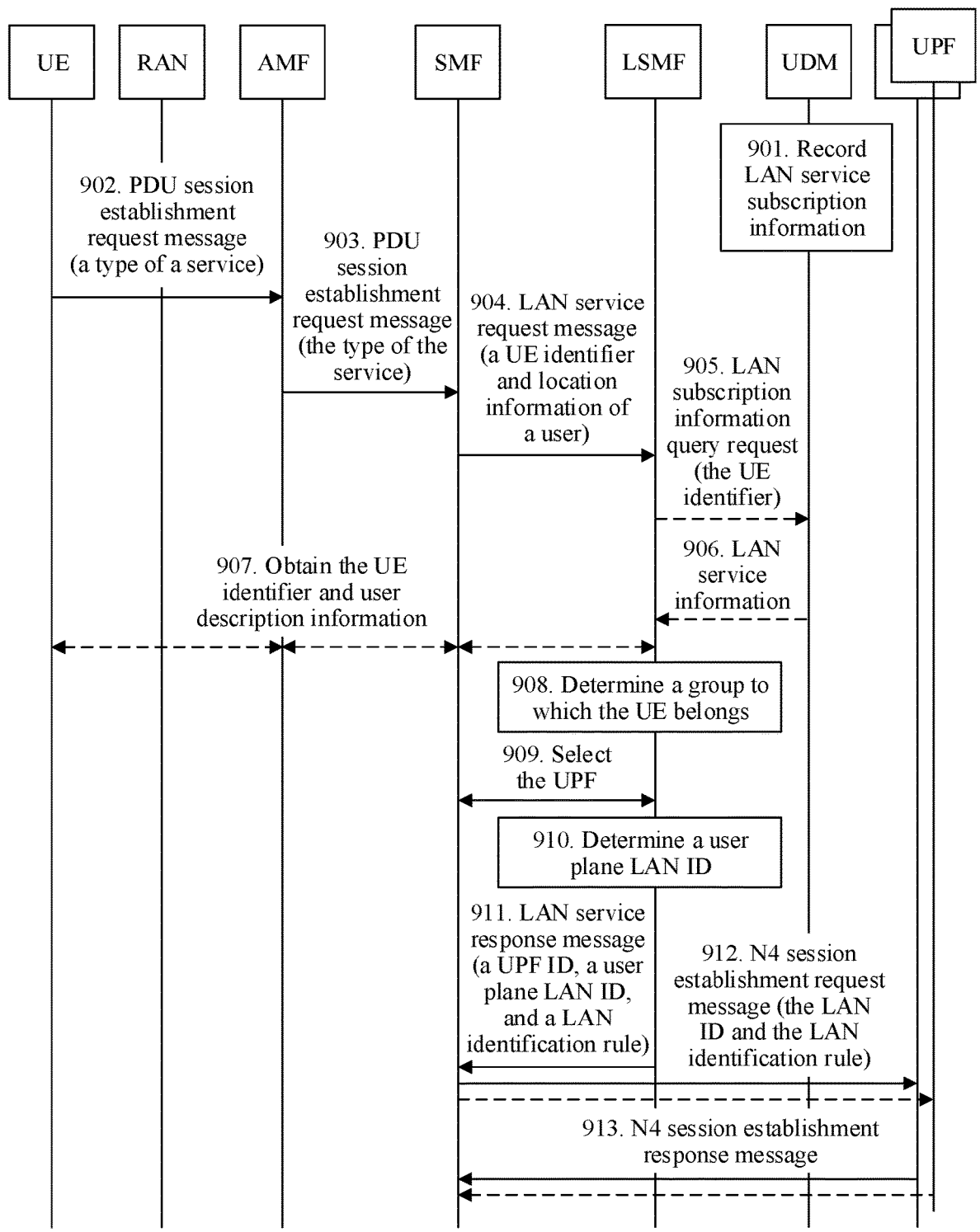
FIG. 9 is a schematic flowchart of another communication method according to this application.

FIG. 9 is a schematic flowchart of another communication method according to this application. The method includes the following steps.

Step 901. Based on static subscription, a UDM records LAN service subscription information.

The LAN service subscription information includes a LAN name, a LAN ID, and a member list. IDs of members in the member list may be expressed in a plurality of manners, for example, an international mobile subscriber identity (IMSI), a subscription permanent identifier (SUPI), a permanent equipment identifier (PEI), and a MAC address.

The LAN name is a name of a group, for example, may be a "finance group" or a "process group".

The LAN ID is an identifier of a LAN group in a control plane.

Step 902. UE initiates a PDU session establishment request message, and the PDU session establishment request message explicitly specifies that a LAN service needs to be established.

In a specific implementation, a type of a service requested by the UE may be carried in the PDU session establishment request message, and the type of the service is the LAN service.

Step 903. After receiving the PDU session establishment request message, an AMF selects an SMF, and sends the PDU session establishment request message to the SMF.

Step 904. The SMF sends a LAN service request message to an LSMF.

If the SMF parses the PDU session establishment request message, and finds that the LAN service is requested, the SMF sends the LAN service request message to the LSMF, to request a location of a LAN service subscribed to by the UE and a user plane LAN ID. The LAN service request message carries a UE identifier and location information of a user.

Step 905. The LSMF queries whether LAN service information has been cached locally. If the LAN service information has been not cached locally, the LSMF initiates a LAN subscription information query request to the UDM, where the LAN subscription information query request may carry the UE identifier, such as an IMSI, an SUPI, a PEI, or a MAC address.

Step 906. The UDM queries, based on the UE identifier, the LAN service subscribed to by the UE, and sends the LAN service information (for example, including a LAN ID, a member list, a location of the LAN service, a served UE type, or a QoS policy) to the LSMF.

Step 905 and step 906 are optional steps.

Step 907. Obtain the UE identifier and user description information.

Step 907 is an optional step. Optionally, if the LSMF finds that a UE identifier provided by the SMF is incomplete, the LSMF may actively initiate a procedure to obtain the UE identifier, and request, by using a NAS message, the UE to report the UE identifier and the user description information.

Step 908. The LSMF determines a group to which the UE belongs.

The LSMF obtains the complete LAN service information, including the LAN ID, the member list (used to determine a group relationship based on an ID), the location of the LAN service (used to determine a group relationship based on a location), the served UE type (used to determine a group relationship based on a device type), the QoS policy, and the like. The LSMF determines the group to which the UE belongs and checks whether another UE in the group has gone online.

Step 909. The LSMF selects a UPF for current UE based on a distribution location of a current group.

In an alternative manner, the LSMF may further select the UPF for the UE through negotiation with the SMF.

In another alternative manner, the LSMF may further inform the SMF to select a proper UPF for the UE.

Step 910. The LSMF determines the user plane LAN ID.

Step 911. The LSMF sends a LAN service response message to the SMF, where the LAN service response message includes the location (UPF ID) of the LAN service, the user plane LAN ID (for example, a VLAN ID), and a LAN identification rule.

In an example, the LAN identification rule includes, for example:
{a UPF ID 1, a user plane LAN ID 1, a LAN identification rule 1 and associated ports (an N4 session, an N9 tunnel, and the like), and a LAN identification rule 2 and associated ports (the N4 session, the N9 tunnel, and the like)}; and {a UPF ID 2, a user plane LAN ID 2, the LAN identification rule 1 and the associated ports (the N4 session, the N9 tunnel, and the like), and the LAN identification rule 2 and the associated ports (the N4 session, the N9 tunnel, and the like)}.

Step 912. The SMF initiates an N4 session establishment request message to the UPF, where the N4 session establishment request message carries the user plane LAN ID and the LAN identification rule.

Step 913. The UPF completes work such as session establishment and LAN identification rule setup, and then sends an N4 session establishment response message to the SMF.

Based on the solution, a 3GPP network can automatically identify a LAN service of the UE, and dynamically deploy a LAN local switch service.

Figure 10:
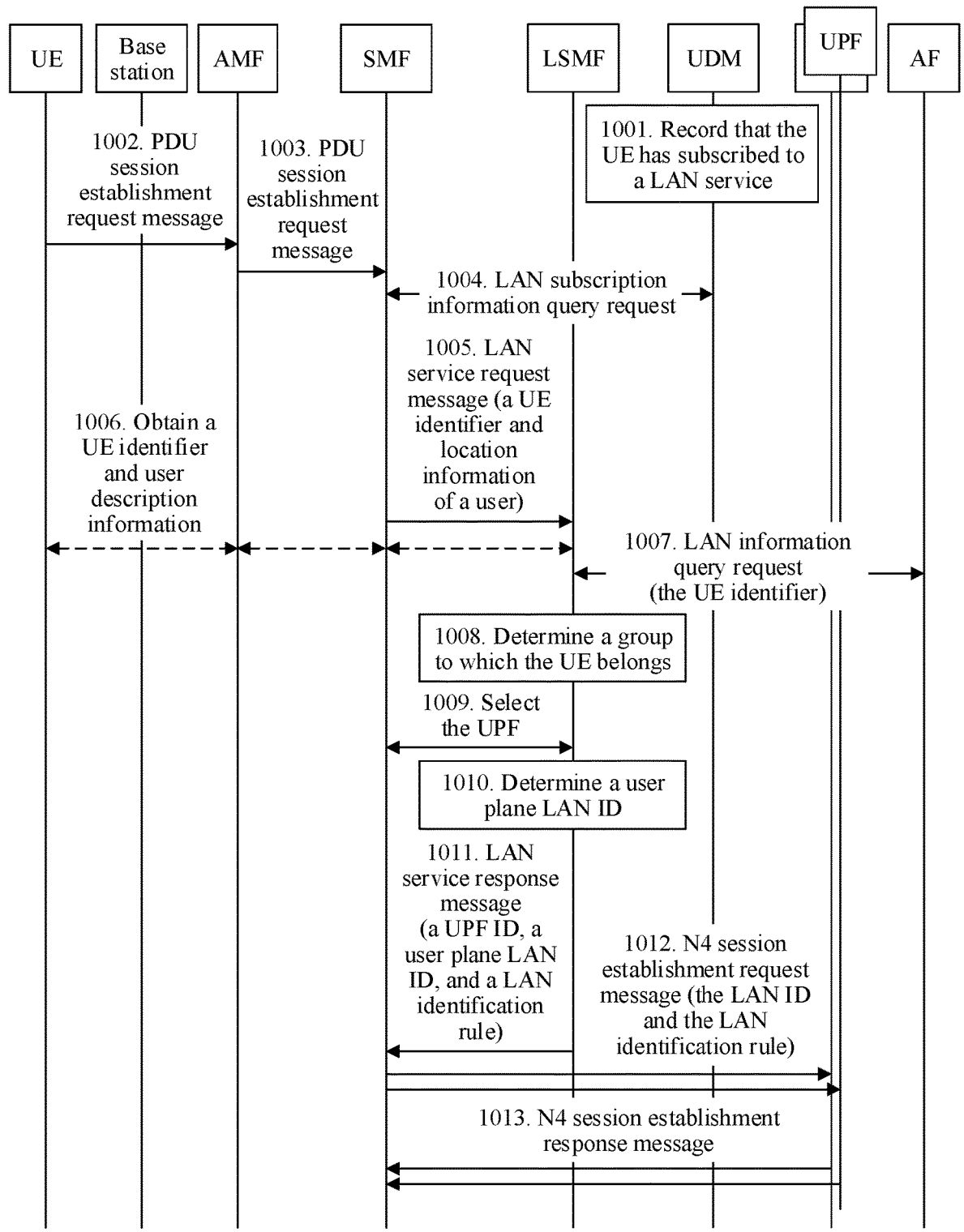
FIG. 10 is a schematic flowchart of another communication method according to this application.

FIG. 10 is a schematic flowchart of another communication method according to this application. The method includes the following steps.

Step 1001. A UDM records that UE has subscribed to a LAN service, but does not have detailed information about the service.

Step 1002. The UE initiates a PDU session establishment request message.

Step 1003. After receiving the PDU session establishment request message, an AMF selects an SMF, and sends the PDU session establishment request message to the SMF.

Step 1004. The SMF initiates a LAN subscription information query request to the UDM, and the UDM indicates that the UE has subscribed to the LAN service, but does not return complete LAN service information.

Step 1005. The SMF sends a LAN service request message to the LSMF.

If the SMF finds that the UE requests the LAN service, the SMF sends the LAN service request message to the LSMF, to request a location of a LAN service subscribed to by the UE and a user plane LAN ID. The LAN service request message carries a UE identifier and location information of a user.

Step 1006. Obtain the UE identifier and user description information.

Step 1006 is an optional step. Optionally, if the LSMF finds that a UE identifier provided by the SMF is incomplete, the LSMF may actively initiate a procedure to obtain the UE identifier, and request, by using a NAS message, the UE to report the UE identifier and the user description information.

Step 1007. The LSMF queries whether the LAN service information is cached locally. If the LAN service information is not cached locally, the LSMF initiates the LAN subscription information query to an AF, where the LAN subscription information query carries the UE identifier, such as an MSISDN, a GPSI, a PEI, and a MAC address. The AF returns the found LAN service information.

Step 1007 is an optional step.

Step 1008 to step 1013 are the same as step 908 to step 913 in the embodiment shown in FIG. 9. Refer to the foregoing descriptions, and details are not described herein again.

Differences between this solution and the solution shown in FIG. 9 lie in that: (1) The UE is unaware of the LAN service completely, and can only initiate a common PDU session establishment request message. (2) The UDM does not have the complete LAN service information and simply records that the user has subscribed to the LAN service.

Figure 11:
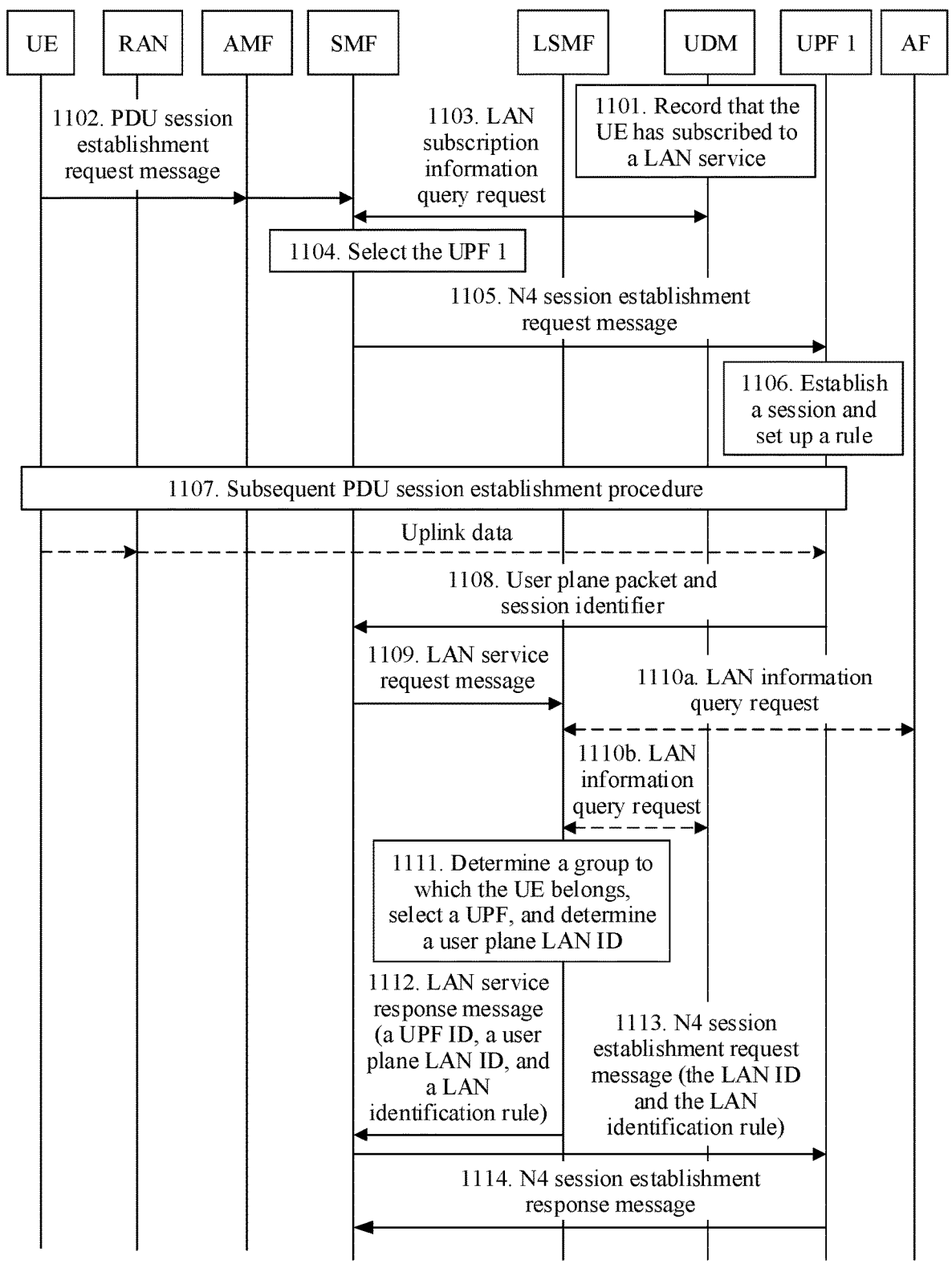
FIG. 11 is a schematic flowchart of another communication method according to this application.

FIG. 11 is a schematic flowchart of another communication method according to this application. The method includes the following steps.

Step 1101. A UDM records that UE has subscribed to a LAN service, but does not have detailed information about the service.

Step 1102. The UE initiates a PDU session establishment request message. After receiving the PDU session establishment request message, an AMF selects an SMF, and sends the PDU session establishment request message to the SMF.

Step 1103. The SMF initiates a LAN subscription information query request to the UDM, and the UDM indicates that the UE has subscribed to the LAN service, but does not return complete LAN service information.

Step 1104. The SMF selects a UPF 1.

The SMF finds that the UE requests the LAN service and determines not to create the LAN service temporarily. Instead, the SMF first connects a user to a core network. The SMF selects a UPF, for example, the UPF 1, and records that a session is associated with the LAN service.

Step 1105. The SMF initiates an N4 session establishment request message to the UPF, indicates the UPF 1 to report a user plane packet of the session, and waits for a forwarding rule.

Step 1106. The UPF 1 establishes a session and sets a rule, where the rule that is set is reporting the user plane packet and waiting for the forwarding rule.

Step 1107. The SMF completes a subsequent session establishment procedure.

Step 1108. Uplink data (namely, the user plane packet) of the UE arrives at the UPF 1, and the UPF 1 sends the received user plane packet (the UPF 1 may send the user plane packet, or send a part of bytes of the user plane packet, for example, first 64 bytes or first 128 bytes of the packet) and a session identifier to the SMF, and requests the forwarding rule.

Step 1109. If the SMF determines, based on the session identifier after receiving the user plane packet and the session identifier, that the user plane packet is from a LAN user, the SMF sends a LAN service request message to the LSMF, to request a LAN user plane rule. The LAN service request message carries a UPF ID and the user plane packet (or the part of bytes of the user plane packet).

Step 1110a. The LSMF first determines whether a LAN service corresponding to the user plane packet exists locally. If no LAN service corresponding to the user plane packet exists locally, the LSMF initiates a LAN information query request to an AF. The LAN information query request carries information such as, a user source address, a destination address, and an upper layer protocol, or a user plane packet (or a part of bytes of the user plane packet). The LAN information query request may further include a UE identifier, such as a mobile subscriber ISDN number (MSISDN), a GPSI or a PEI. The AF returns the found LAN service information.

In an alternative manner of step 1110a, a LAN service message may also be obtained by performing step 1110b, that is, the LSMF initiates the LAN information query request to the UDM. The LAN information query request may carry a UE identifier, such as an IMSI, an SUPI, a PEI, or a MAC address. The UDM may return the LAN service information to the LSMF.

Step 1111. The LSMF determines a group to which the UE belongs, selects a UPF for current UE based on a distribution location of a current group, and determines a user plane LAN ID.

The LSMF obtains the complete LAN service information, including a LAN ID, a member list (used to determine a group relationship based on a UE ID), a location of the LAN service (used to determine a group relationship based on a location), a served UE type (used to determine a group relationship based on a device type), a QoS policy, and the like. The LSMF determines the group to which the UE belongs and checks whether another UE in the group has gone online. Then, the LSMF selects the UPF for the current UE based on the distribution location of the current group, and determines the user plane LAN ID for the UE.

Step 1112 to step 1114 are the same as step 911 to step 913 in the embodiment shown in FIG. 9. Refer to the foregoing descriptions. Details are not described herein again.

In the solution, the LSMF determines, by using characteristic information of the user plane packet, a group to which an initiator of a current service belongs, and dynamically deploys a LAN local switch service.

Figure 12:
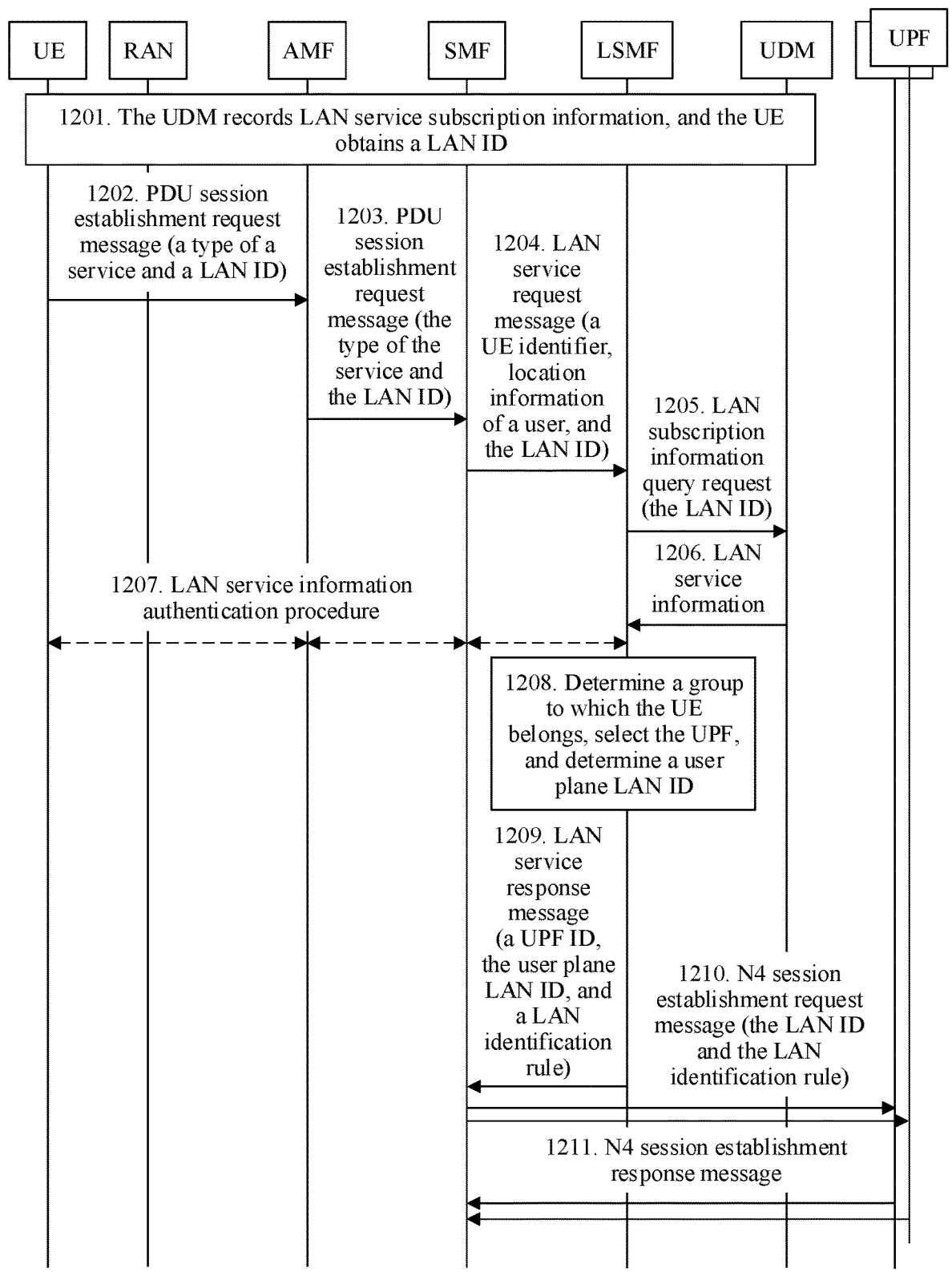
FIG. 12 is a schematic flowchart of another communication method according to this application.

FIG. 12 is a schematic flowchart of another communication method according to this application. The method includes the following steps.

Step 1201. Based on static subscription, a UDM records LAN service subscription information, including a LAN name, a LAN ID, and a member list. IDs of members in the member list may be expressed in a plurality of manners, for example, an IMSI, an SUPI, a PEI, and a MAC address. UE obtains the LAN ID.

Step 1202. The UE initiates a PDU session establishment request message, and the PDU session establishment request message explicitly specifies that a LAN service needs to be established, and the PDU session establishment request message carries the LAN ID.

In a specific implementation, a type of a service requested by the UE and the LAN ID may be carried in the PDU session establishment request message, and the type of the service is the LAN service.

Step 1203. After receiving the PDU session establishment request message, an AMF selects an SMF, and sends the PDU session establishment request message to the SMF.

Step 1204. The SMF sends a LAN service request message to an LSMF.

If the SMF parses the PDU session establishment request message, and finds that the LAN service is requested, the SMF sends the LAN service request message to the LSMF, to request a location of a LAN service subscribed to by the UE and a user plane LAN ID. The LAN service request message carries a UE identifier, location information of a user, and a LAN ID.

Step 1205. The LSMF queries whether LAN service information has been cached locally. If the LAN service information is not cached locally, the LSMF initiates a LAN subscription information query request to the UDM, where the LAN subscription information query request carries the LAN ID.

Step 1206. The UDM queries the subscribed LAN service information based on the LAN ID, and sends the subscribed LAN service information to the LSMF.

Step 1207. If the LAN service information specifies that a user identity needs to be authenticated, the LSMF initiates an authentication procedure on behalf of a LAN service provider.

Step 1207 is an optional step.

Step 1208. The LSMF determines, based on the LAN service information, a group to which the UE belongs, and checks whether another user in the group has gone online. The LSMF selects a proper UPF based on a distribution location of a current group and determines the user plane LAN ID.

Step 1209. The LSMF sends a LAN service response message to the SMF, where the LAN service response message includes a location (UPF ID) of the LAN service, a user plane LAN ID (for example, a VLAN ID), and a LAN identification rule.

In an example, the LAN identification rule includes, for example:
- {a UPF ID 1, a user plane LAN ID 1, a LAN identification rule 1 and associated ports (an N4 session, an N9 tunnel, and the like), and a LAN identification rule 2 and associated ports (the N4 session, the N9 tunnel, and the like)}; and
- {a UPF ID 2, a user plane LAN ID 2, the LAN identification rule 1 and the associated ports (the N4 session, the N9 tunnel, and the like), and the LAN identification rule 2 and the associated ports (the N4 session, the N9 tunnel, and the like)}.

Step 1210. The SMF initiates an N4 session establishment request message to the UPF, where the N4 session establishment request message carries the user plane LAN ID and the LAN identification rule.

Step 1211. The UPF completes work such as session establishment and LAN identification rule setup, and then sends an N4 session establishment response message to the SMF.

The solution is applicable to a scenario in which the UE has obtained, in advance, a LAN ID pre-allocated by a network. Based on the solution, isolated group communication may be dynamically created for the UE.

In addition, it should be noted that a message name in this application may be changed to another name with evolution of a communications standard. A message that has a same function meaning and that is merely a change of a message name still falls within the protection scope of this application.

It may be understood that to implement the foregoing functions, each network element includes a corresponding hardware structure and/or software module for implementing each function. A person skilled in the art should easily be aware that, in combination with the examples described in the embodiments disclosed in this specification, units and algorithm steps may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 13:
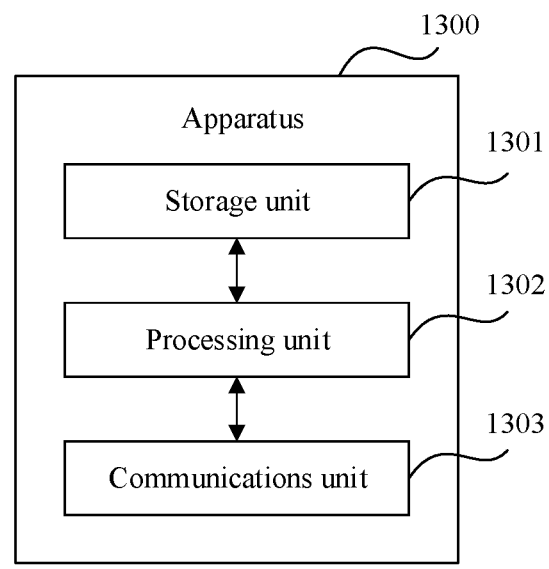
FIG. 13 is a schematic diagram of an apparatus according to this application.

FIG. 13 shows an example of a possible block diagram of an apparatus in an embodiment of the present disclosure. The apparatus 1300 may exist in a form of software. The apparatus 1300 may include a processing unit 1302 and a communications unit 1303. In an implementation, the communications unit 1303 may include a receiving unit and a sending unit. The processing unit 1302 is configured to control and manage an action of the apparatus 1300. The communications unit 1303 is configured to support the apparatus 1300 in communicating with another network entity. The apparatus 1300 may further include a storage unit 1301, configured to store program code and data of the apparatus 1300.

The processing unit 1302 may be a processor or a controller, for example, a general-purpose central processing unit (CPU), a general-purpose processor, a digital signal processor (DSP), an application specific integrated circuit (ASIC), a field programmable gate array (FPGA) or another programmable logic device, a transistor logic device, a hardware component, or any combination thereof. The processing unit 1302 may implement or execute various example logical blocks, modules, and circuits described with reference to content disclosed in the present disclosure. The processor may be a combination of processors implementing a computing function, for example, a combination of one or more microprocessors, or a combination of the DSP and the microprocessor. The communications unit 1303 may be a communications interface, a transceiver, a transceiver circuit, or the like, where the communications interface is a general name, and may include a plurality of interfaces during specific implementation. The storage unit 1301 may be a memory.

In the first application, the apparatus 1300 may be the user plane network element in any one of the foregoing embodiments, or may be a chip in the user plane network element. For example, when the apparatus 1300 may be a user plane network element, the processing unit may be, for example, a processor, the communications unit may be, for example, a transceiver, and the transceiver includes a radio frequency circuit. Optionally, the storage unit may be, for example, a memory. For example, when the apparatus 1300 is a chip in the user plane network element, the processing unit may be, for example, a processor, and the communications unit may be, for example, an input/output interface, a pin, or a circuit. The processing unit may execute a computer-executable instruction stored in the storage unit. Optionally, the storage unit is a storage unit in the chip, such as a register or a cache. Alternatively, the storage unit may be a storage unit that is in the user plane network element and that is located outside the chip, such as a read-only memory (ROM), another type of static storage device that can store static information and an instruction, or a random access memory (RAM).

Specifically, when the communications unit 1303 includes a sending unit and a receiving unit, the receiving unit is configured to receive a first packet from a first device; the processing unit is configured to determine a user plane local area network LAN identifier corresponding to the first packet, where the user plane LAN identifier is a user plane identifier of a LAN group; and the sending unit is configured to send the first packet to a second device based on the user plane LAN identifier and a destination address in the first packet.

In a possible implementation, the first device is a first terminal; and the processing unit is specifically configured to: determine flow characteristic information of the first packet, where the flow characteristic information is a session identifier, a session identifier and a quality of service flow identifier QFI, a tunnel endpoint identifier TEID, or a TEID and a QFI; and determine, according to a LAN identification rule, the user plane LAN identifier corresponding to the first packet, where the LAN identification rule includes a correspondence between the flow characteristic information and the user plane LAN identifier.

In a possible implementation, the first device is a second user plane network element; and the processing unit is specifically configured to: determine an identifier of a tunnel for receiving the first packet; and determine, according to a LAN identification rule, the user plane LAN identifier corresponding to the first packet, where the LAN identification rule includes a correspondence between the identifier of the tunnel and the user plane LAN identifier.

In a possible implementation, the processing unit is further configured to: determine, based on the user plane LAN identifier, a virtual forwarding instance corresponding to the user plane LAN identifier, where the virtual forwarding instance includes a correspondence between the destination address and a forwarding port, and the forwarding port corresponds to the second device; and determine the forwarding port based on the virtual forwarding instance; and the sending unit is specifically configured to send the first packet to the second device through the forwarding port.

In a possible implementation, the receiving unit is further configured to receive the LAN identification rule from a first control plane network element.

In a possible implementation, the receiving unit is further configured to receive the user plane LAN identifier from the first control plane network element.

In a possible implementation, the second device is a second terminal or a third user plane network element.

In a possible implementation, the user plane LAN identifier is a single virtual local area network identifier VLAN ID, a double VLAN ID, or a route distinguisher RD.

In the second application, the apparatus 1300 may be the network service management network element in any one of the foregoing embodiments, or may be a chip in the network service management network element. For example, when the apparatus 1300 may be the network service management network element, the processing unit may be, for example, a processor, the communications unit may be, for example, a transceiver, and the transceiver includes a radio frequency circuit. Optionally, the storage unit may be, for example, a memory. For example, when the apparatus 1300 may be the chip in the network service management network element, the processing unit may be, for example, a processor, and the communications unit may be, for example, an input/output interface, a pin, or a circuit. Optionally, the storage unit may be a storage unit in the chip, such as a register or a cache. Alternatively, the storage unit may be a storage unit that is in the network service management network element and that is located outside the chip, such as a ROM, another type of static storage device that can store static information and an instruction, or a RAM.

Specifically, when the communications unit 1303 includes a sending unit and a receiving unit:

In the first embodiment, the receiving unit is configured to receive a request message from a session management network element, where the request message includes an identifier of a first terminal, and the request message is used to request a local area network LAN service. The processing unit is configured to obtain LAN service information corresponding to the first terminal, where the LAN service information includes an identifier of a LAN group corresponding to the first terminal; allocate a user plane LAN identifier to the first terminal based on the LAN service information; and determine flow characteristic information of the first terminal, where the flow characteristic information is a session identifier, a session identifier and a QFI, a tunnel endpoint identifier TEID, or a TEID and a QFI. The sending unit is configured to send a LAN identification rule and the user plane LAN identifier to the session management network element, where the LAN identification rule includes a correspondence between the flow characteristic information and the user plane LAN identifier.

In a possible implementation, the processing unit is specifically configured to: locally obtain the LAN service information corresponding to the first terminal; or obtain the LAN service information corresponding to the first terminal from a data management network element; or obtain the LAN service information corresponding to the first terminal from an application server; or if the request message further includes the identifier of the LAN group, obtain the LAN service information corresponding to the first terminal from the request message.

In a possible implementation, the LAN service information further includes member information of the LAN group, and the member information includes at least one of an identifier, location information, or a terminal type of a second terminal.

In a possible implementation, the processing unit is further configured to select a user plane network element for the first terminal based on a distribution location of a user plane network element in the LAN group; and the sending unit is further configured to send an identifier of the user plane network element to the session management network element.

In a possible implementation, the processing unit is further configured to determine an identifier of a tunnel, the LAN identification rule sent by the sending unit to the session management network element further includes a correspondence between the identifier of the tunnel and the user plane LAN identifier, and the tunnel is a tunnel between different user plane network elements.

In the second embodiment, the receiving unit is configured to: receive a request message from a session management network element, where the request message includes an identifier of a user plane network element and packet information, the packet information includes an uplink packet or partial information of the uplink packet, and the request message is used to request a LAN service corresponding to the uplink packet. The processing unit is configured to: obtain LAN service information corresponding to the uplink packet, where the LAN service information includes an identifier of a LAN group corresponding to a first terminal; allocate a user plane LAN identifier to the first terminal based on the LAN service information; determine flow characteristic information of the first terminal, where the flow characteristic information is a session identifier, a session identifier and a QFI, a tunnel endpoint identifier TEID, or a TEID and a QFI. The sending unit is configured to send the user plane LAN identifier and a LAN identification rule to the session management network element, where the LAN identification rule includes a correspondence between the flow characteristic information and the user plane LAN identifier.

In a possible implementation, the processing unit is specifically configured to: locally obtain the LAN service information corresponding to the uplink packet; or obtain the LAN service information corresponding to the uplink packet from an application server.

In a possible implementation, the LAN service information further includes member information of the LAN group, and the member information includes at least one of an identifier, location information, or a terminal type of a second terminal.

In a possible implementation, the processing unit is further configured to determine an identifier of a tunnel, the LAN identification rule sent by the sending unit to the session management network element further includes a correspondence between the identifier of the tunnel and the user plane LAN identifier, and the tunnel is a tunnel between different user plane network elements.

In the third application, the apparatus 1300 may be the session management network element in any one of the foregoing embodiments, or may be a chip in the session management network element. For example, when the apparatus 1300 may be the session management network element, the processing unit may be, for example, a processor, the communications unit may be, for example, a transceiver, and the transceiver includes a radio frequency circuit. Optionally, the storage unit may be, for example, a memory. For example, when the apparatus 1300 may be the chip in the session management network element, the processing unit may be, for example, a processor, and the communications unit may be, for example, an input/output interface, a pin, or a circuit. Optionally, the storage unit is a storage unit in the chip, such as a register or a cache. Alternatively, the storage unit may be a storage unit that is in the session management network element and that is located outside the chip, such as a ROM, another type of static storage device that can store static information and an instruction, or a RAM.

Specifically, when the communications unit 1303 includes a sending unit and a receiving unit:

In the first embodiment, the receiving unit is configured to receive a session establishment request message from a terminal, where the session establishment request message includes an identifier of the terminal. The processing unit is configured to determine that a type of a service requested by the terminal is a LAN service. The sending unit is configured to send a request message to a network service management network element, where the request message includes the identifier of the terminal, and the request message is used to request the LAN service. The receiving unit is further configured to receive a LAN identification rule and a user plane LAN identifier from the network service management network element, where the LAN identification rule includes a correspondence between flow characteristic information and the user plane LAN identifier, and the flow characteristic information is a session identifier, a session identifier and a QFI, a tunnel endpoint identifier TEID, or a TEID and a QFI. The sending unit is further configured to send the LAN identification rule and the user plane LAN identifier to a user plane network element, where the LAN identification rule includes the correspondence between the flow characteristic information and the user plane LAN identifier.

In a possible implementation, the session establishment request message includes the type of the service requested by the terminal, and the type of the service is the LAN service.

In a possible implementation, the session establishment request message further includes an identifier of a LAN group, and the request message further includes the identifier of the LAN group.

In a possible implementation, the sending unit is further configured to send a subscription information request message to a data management network element, where the subscription information request message includes the identifier of the terminal. The receiving unit is further configured to receive a subscription information response message from the data management network element, where the subscription information response message indicates that the terminal has subscribed to the LAN service. The processing unit is specifically configured to determine, based on the subscription information response message, that the type of the service requested by the terminal is the LAN service.

In the second embodiment, the receiving unit is configured to receive a session establishment request message from a terminal, where the session establishment request message includes an identifier of the terminal and a session identifier. The processing unit is configured to determine that a type of a service requested by the terminal is a LAN service, where there is an association between a session and the LAN service; and select a user plane network element for the terminal. The receiving unit is configured to receive an uplink packet from the user plane network element. The sending unit is further configured to send a request message to a network service management network element, where the request message includes an identifier of the user plane network element and packet information, the packet information includes the uplink packet or partial information of the uplink packet, and the request message is used to request a LAN service corresponding to the uplink packet. The receiving unit is further configured to receive a LAN identification rule and a user plane LAN identifier from the network service management network element, where the user plane LAN identifier corresponds to the uplink packet, the LAN identification rule includes a correspondence between flow characteristic information and the user plane LAN identifier, and the flow characteristic information is the session identifier, the session identifier and a QFI, a tunnel endpoint identifier TEID, or a TEID and a QFI.

In a possible implementation, the session establishment request message includes the type of the service requested by the terminal, and the type of the service is the LAN service.

In a possible implementation, the sending unit is further configured to send a subscription information request message to a data management network element, where the subscription information request message includes the identifier of the terminal. The receiving unit is further configured to receive a subscription information response message from the data management network element, where the subscription information response message indicates that the terminal has subscribed to the LAN service. The processing unit is specifically configured to determine, based on the subscription information response message, that the type of the service requested by the terminal is the LAN service.

In the fourth application, the apparatus 1300 may be the first control plane network element in any one of the foregoing embodiments, or may be a chip in the first control plane network element. For example, when the apparatus 1300 may be the first control plane network element, the processing unit may be, for example, a processor, the communications unit may be, for example, a transceiver, and the transceiver includes a radio frequency circuit. Optionally, the storage unit may be, for example, a memory. For example, when the apparatus 1300 may be the chip in the first control plane network element, the processing unit may be, for example, a processor, and the communications unit may be, for example, an input/output interface, a pin, or a circuit. Optionally, the storage unit is a storage unit in the chip, such as a register or a cache. Alternatively, the storage unit may be a storage unit that is in the first control plane network element and that is located outside the chip, such as a ROM, another type of static storage device that can store static information and an instruction, or a RAM.

Specifically, when the communications unit 1303 includes a sending unit and a receiving unit, the processing unit is configured to determine that a type of a service requested by a terminal is a LAN service; obtain LAN service information corresponding to the terminal, where the LAN service information includes an identifier of a LAN group corresponding to the terminal; allocate a user plane LAN identifier to the terminal based on the LAN service information; and determine flow characteristic information of the terminal, where the flow characteristic information is a session identifier, a session identifier and a quality of service flow identifier QFI, a tunnel endpoint identifier TEID, or a TEID and a QFI; and the sending unit is configured to send a LAN identification rule and the user plane LAN identifier to a user plane network element, where the LAN identification rule includes a correspondence between the flow characteristic information and the user plane LAN identifier.

In a possible implementation, the processing unit is further configured to select the user plane network element for the terminal based on a distribution location of a user plane network element in the LAN group.

In a possible implementation, the receiving unit is configured to receive an uplink packet from the user plane network element and the session identifier; and the processing unit is specifically configured to obtain the LAN service information based on the uplink packet.

In a possible implementation, the receiving unit is configured to receive a session establishment request message from the terminal, where the session establishment request message includes the type of the service requested by the terminal, and the type of the service is the LAN service.

In a possible implementation, the sending unit is further configured to send a subscription information request message to a data management network element, where the subscription information request message includes an identifier of the terminal; the receiving unit is configured to receive a subscription information response message from the data management network element, where the subscription information response message indicates that the terminal has subscribed to the LAN service; and the processing unit is specifically configured to determine, based on the subscription information response message, that the type of the service requested by the terminal is the LAN service.

In a possible implementation, the processing unit is specifically configured to: locally obtain the LAN service information corresponding to the terminal; or obtain the LAN service information corresponding to the terminal from the data management network element; or obtain the LAN service information corresponding to the terminal from an application server.

In a possible implementation, the processing unit is further configured to determine an identifier of a tunnel, where the LAN identification rule sent by the sending unit to the user plane network element further includes a correspondence between the identifier of the tunnel and the user plane LAN identifier, and the tunnel is a tunnel between the user plane network element and another user plane network element.

When the apparatus shown in FIG. 13 is a user plane network element, a session management network element, a network service management network element, or a first control plane network element, for specific beneficial effects of the communication method performed by the apparatus, refer to related descriptions in the foregoing method embodiments. Details are not described herein again.

Figure 14:
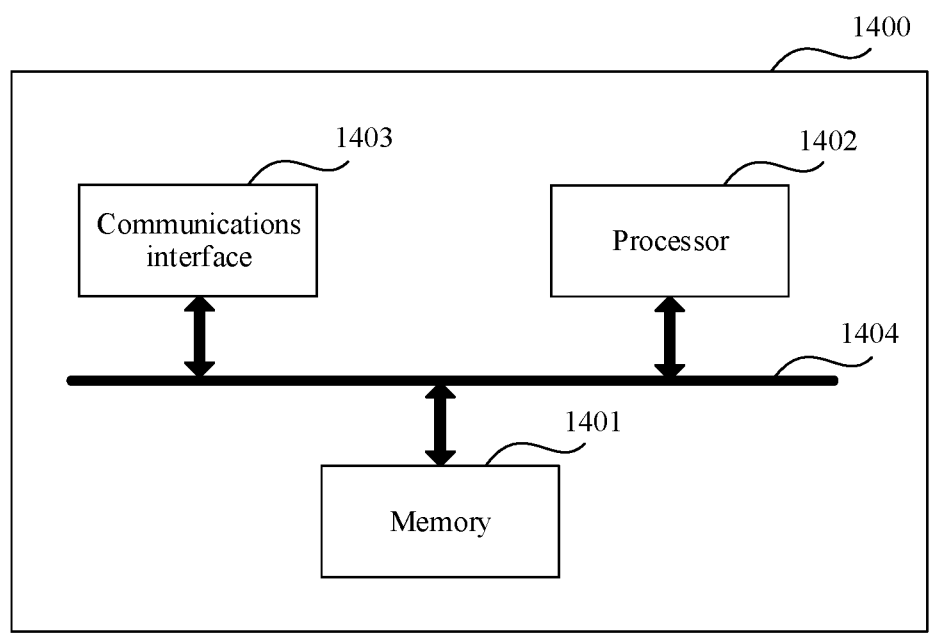
FIG. 14 is a schematic diagram of another apparatus according to this application.

FIG. 14 is a schematic diagram of an apparatus according to this application. The apparatus may be the session management network element, the network service management network element, the user plane network element, or the first control plane network element. The apparatus 1400 includes a processor 1402, a communications interface 1403, and a memory 1401. Optionally, the apparatus 1400 may further include a bus 1404. The communications interface 1403, the processor 1402, and the memory 1401 may be connected to each other by using the line of communication 1404. The line of communication 1404 may be a peripheral component interconnect (PCI) bus, an extended industry standard architecture (EISA) bus, or the like. The line of communication 1404 may be classified into an address bus, a data bus, a control bus, and the like. For ease of representation, only one thick line is used to represent the bus in FIG. 14, but this does not mean that there is only one bus or only one type of bus.

The processor 1402 may be a CPU, a microprocessor, an ASIC, or one or more integrated circuits configured to control program execution in the solutions in this application.

The communications interface 1403 uses any apparatus like a transceiver, and is configured to communicate with another device or a communications network, for example, an Ethernet, a radio access network (RAN), a wireless local area network (WLAN), or a wired access network.

The memory 1401 may be a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor by using the line of communication 1404. Alternatively, the memory may be integrated with the processor.

The memory 1401 is configured to store a computer-executable instruction for performing the solutions in this application, and the processor 1402 controls execution of the computer-executable instruction. The processor 1402 is configured to execute the computer-executable instruction stored in the memory 1401, to implement the communication method provided in the foregoing embodiments of this application.

Optionally, the computer-executable instruction in this embodiment of this application may also be referred to as application program code. This is not specifically limited in this embodiment of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an ASIC, a FPGA or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by the processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor may read information from the storage medium and write information to the storage medium. Optionally, the storage medium may further be integrated into the processor. The processor and the storage medium may be disposed in the ASIC, and the ASIC may be disposed in a terminal. Optionally, the processor and the storage medium may also be disposed in different components of a terminal.

These computer program instructions may alternatively be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specified function in one or more procedures in the flowcharts and/or in one or more blocks in the block diagrams.

Although this application is described with reference to specific features and the embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communication method, comprising:
   receiving, by a first user plane network element, a first packet from a first device, wherein the first device is a first terminal;
   determining, by the first user plane network element, a user plane local area network (LAN) identifier corresponding to the first packet, wherein the user plane LAN identifier is a user plane identifier of a LAN group, wherein determining the user plane LAN identifier comprises:
      determining, by the first user plane network element, flow characteristic information of the first packet, wherein the flow characteristic information comprises at least one of a session identifier, a quality of service flow identifier (QFI), or a tunnel endpoint identifier (TEID); and
      determining, by the first user plane network element according to a LAN identification rule, the user plane LAN identifier corresponding to the first packet, wherein the LAN identification rule comprises a correspondence between the flow characteristic information and the user plane LAN identifier; and
   sending, by the first user plane network element, the first packet to a second device based on the user plane LAN identifier and a destination address in the first packet.

2. The method according to claim 1, wherein sending the first packet comprises:
   determining, by the first user plane network element based on the user plane LAN identifier, a virtual forwarding instance corresponding to the user plane LAN identifier, wherein the virtual forwarding instance comprises a correspondence between the destination address and a forwarding port, and the forwarding port corresponds to the second device;
   determining, by the first user plane network element, the forwarding port based on the virtual forwarding instance; and
   sending, by the first user plane network element, the first packet to the second device through the forwarding port.

3. The method according to claim 1, wherein the method further comprises:
receiving, by the first user plane network element, the LAN identification rule from a first control plane network element.

4. The method according to claim 1, wherein the method further comprises:
receiving, by the first user plane network element, the user plane LAN identifier from a first control plane network element.

5. The method according to claim 1, wherein the user plane LAN identifier is a single virtual local area network identifier (VLAN ID), a double VLAN ID, or a route distinguisher (RD).

6. A communications apparatus, comprising:
a receiver;
a transmitter;
at least one processor coupled with the transmitter and the receiver; and
one or more memories coupled to the at least one processor and storing programming instructions for execution by the at least one processor to cause the apparatus to:
receive, through the receiver, a first packet from a first device;
determine a user plane local area network (LAN) identifier corresponding to the first packet, wherein the user plane LAN identifier is a user plane identifier of a LAN group, wherein the determine the user plane LAN identifier comprises:
determine flow characteristic information of the first packet, wherein the flow characteristic information comprises at least one of a session identifier, a quality of service flow identifier (QFI), or a tunnel endpoint identifier (TEID); and
determine, according to a LAN identification rule, the user plane LAN identifier corresponding to the first packet, wherein the LAN identification rule comprises a correspondence between the flow characteristic information and the user plane LAN identifier; and
send, through the transmitter, the first packet to a second device based on the user plane LAN identifier and a destination address in the first packet.

7. The apparatus according to claim 6, wherein the one or more memories store programming instructions for execution by the at least one processor to cause the apparatus to:
determine, based on the user plane LAN identifier, a virtual forwarding instance corresponding to the user plane LAN identifier, wherein the virtual forwarding instance comprises a correspondence between the destination address and a forwarding port, and the forwarding port corresponds to the second device;
determine the forwarding port based on the virtual forwarding instance; and
send, through the transmitter, the first packet to the second device through the forwarding port.

8. The apparatus according to claim 6, wherein the one or more memories store programming instructions for execution by the at least one processor to cause the apparatus to receive, through the receiver, the LAN identification rule from a first control plane network element.

9. The apparatus according to claim 6, wherein the one or more memories store programming instructions for execution by the at least one processor to cause the apparatus to receive, through the receiver, the user plane LAN identifier from a first control plane network element.

10. A communications apparatus, comprising:
a transmitter;
at least one processor coupled with the transmitter; and
one or more memories coupled to the at least one processor and storing programming instructions for execution by the at least one processor to cause the apparatus to:
determine that a type of a service requested by a terminal is a local area network (LAN) service;
obtain LAN service information corresponding to the terminal, wherein the LAN service information comprises an identifier of a LAN group corresponding to the terminal, wherein the obtain the LAN service information corresponding to the terminal comprises:
receive, through a receiver, an uplink packet from a user plane network element; and
obtain the LAN service information corresponding to the uplink packet;
allocate a user plane LAN identifier to the terminal based on the LAN service information;
determine flow characteristic information of the terminal, wherein the flow characteristic information comprises at least one of a session identifier, a quality of service flow identifier (QFI), a tunnel endpoint identifier (TEID), or a QFI; and
send, through the transmitter, a LAN identification rule and the user plane LAN identifier to the user plane network element, wherein the LAN identification rule comprises a correspondence between the flow characteristic information and the user plane LAN identifier.

11. The apparatus according to claim 10, wherein the one or more memories store programming instructions for execution by the at least one processor to cause the apparatus to select the user plane network element for the terminal based on a distribution location of a user plane network element in the LAN group.

12. The apparatus according to claim 10, wherein the apparatus further comprises a receiver, and the one or more memories store programming instructions for execution by the at least one processor to cause the apparatus to receive, through the receiver, a session establishment request message from the terminal, wherein the session establishment request message comprises the type of the service requested by the terminal, and the type of the service is the LAN service.

13. The apparatus according to claim 10, wherein the apparatus further comprises a receiver, and the one or more memories store programming instructions for execution by the at least one processor to cause the apparatus to:
send, through the transmitter, a subscription information request message to a data management network element, wherein the subscription information request message comprises an identifier of the terminal;
receive, through the receiver, a subscription information response message from the data management network element, wherein the subscription information response message indicates that the terminal has subscribed to the LAN service; and
determine, based on the subscription information response message, that the type of the service requested by the terminal is the LAN service.

14. The apparatus according to claim 10, wherein the one or more memories store programming instructions for execution by the at least one processor to cause the apparatus to:
locally obtain the LAN service information corresponding to the terminal; or obtain the LAN service information corresponding to the terminal from a data management network element; or obtain the LAN service information corresponding to the terminal from an application server.

15. The apparatus according to claim 10, wherein the one or more memories store programming instructions for execution by the at least one processor to cause the apparatus to determine an identifier of a tunnel, wherein the LAN identification rule further comprises a correspondence between the identifier of the tunnel and the user plane LAN identifier, and the tunnel is a tunnel between the user plane network element and another user plane network element.

* * * * *